April 19, 1960   J. B. POWERS   2,933,613
METHOD AND APPARATUS FOR SORTING OBJECTS ACCORDING TO COLOR
Filed Nov. 24, 1952   7 Sheets-Sheet 3

INVENTOR.
John B. Powers
BY
Lippincott & Smith
ATTORNEYS

April 19, 1960  J. B. POWERS  2,933,613
METHOD AND APPARATUS FOR SORTING OBJECTS ACCORDING TO COLOR
Filed Nov. 24, 1952  7 Sheets-Sheet 5

INVENTOR.
John B. Powers
BY
Lippincott & Smith
ATTORNEYS

INVENTOR.
John B. Powers
BY
*Lippincott & Smith*
ATTORNEYS

United States Patent Office 2,933,613
Patented Apr. 19, 1960

2,933,613

METHOD AND APPARATUS FOR SORTING OBJECTS ACCORDING TO COLOR

John B. Powers, Davis, Calif., assignor to The Regents of the University of California, Berkeley, Calif., a corporation of California Application November 24, 1952, Serial No. 322,267

37 Claims. (Cl. 250—214)

This application for Letters Patent constitutes a continuation-in-part of an earlier application Serial No. 251,900, filed October 18, 1951 by the present applicant, which application is entitled "Method and Apparatus for Sorting Objects According to Color," now abandoned.

The invention herein relates to methods and means for sorting objects in accordance with color. In its more particular application, the invention is directed to sorting citrus fruits, such as lemons, oranges, grapefruit or the like so as to distinguish between completely mature fruit and fruit of various degress of ripeness or maturity. It is, however, possible also to apply the disclosed principles to other sorting operations, such as the sorting of tomatoes, apples and many other fruits and vegetables.

A practice has grown up in the citrus industry such that lemons, for instance, are picked when they reach substantially full growth, without regard to their immediate marketability, their color or their degree of maturity. It is relatively easy to divide the fruit upon picking into various general classifications ranging from the dark green to the lemon yellow. However, as the fruit approaches maturity sorting often becomes more diffcult. As the sorting is practiced it is logical, in some instances, to store the different color classes for various periods of time, in order that the so-selected and stored fruit shall reach maturity at about the same time for each grade.

As color sorting is now generally practiced in the citrus industry, the foregoing operations are usually carried on manually. It will be apparent, however, that manual sorting operations of this character are such as to introduce a considerable human error into the selection and still further, with wages being in such high brackets the labor charges amount to a rather large part of the total cost of the end product as it reaches the consumer.

According to the present invention, there has been proposed an automatic machine for sorting orchard-run fruit into the desired color classifications in accordance with photoelectric controls. This selecting is such that an especially high degree of accuracy is obtainable when the sorted fruit is close to maturity and marketability. To accomplish this result, the apparatus herein to be described is one in which functioning is generally determined by the average color of the fruit surface so that minor surface blemishes and uneven color distributions introduce but relatively little effect upon the overall operations.

It will be apparent that if the measurement is to be of a strictly useful nature it must be one which can be obtained relatively independently of the many variables of size, shape, surface lustre, orientation of the object, and the many surface contaminants, such as wax, water, dirt and soot. The invention is such that the effect of other troublesome variables which frequently affect operations also are nullified. Such variables include changes in the intensity of the illuminant, sensitivity changes in the photoelectric tube from time to time, power supply fluctuations and other circuit and apparatus variables.

Furthermore, the present invention is one of such a nature as to make it unnecessary to provide any standard color surface as a reference or base from which the operation is carried forward. As the invention is constituted, and as it will be explained herein, the object which is the subject of the sorting operations, such as the lemon, which will be used herein for reference as the object to be sorted, serves as its own reference surface.

Utilization of this invention makes it possible to eliminate from consideration in the overall operating scheme any inherently unstable devices, such as direct-current amplifiers and the like.

As the present invention is constituted and proposed to be practiced, a machine is provided which is adapted to the making of measurements of a character later to be more fully described, but which may be regarded, for the purpose of an initial understanding, as being a measure of the variances in reflectance of the object or fruit, in accordance with the wave lengths of incident light directed thereupon. In consideration of this invention the reflectance of an object for light of any particular wave length is the percentage of incident light of that wave length which is reflected from the object. Colored objects exhibit different reflectances for light of different wave lengths. Where this relationship between the illuminating light wave length and the object reflectance throughout the visible spectrum is graphically shown that graph is known as the spectrophotometric reflectance curve of the object.

It is a well-recognized principle that objects illuminated by wave lengths of light varying from the blue through to the near infra-red exhibit different reflectance properties in accordance with whether the object color is green, light green, or yellow. Similarly, the reflected light from the object at the wavelengths mentioned produces different reflectance for all said values lying between the dark green and the yellow. The chlorophyll which is contained in all fruit exhibits a maximum of light absorption in the general region of 6,780 A. (Angstroms) of the illuminating source. Such absorption thus causes a markedly noticeable dip in any measurements of light reflectance in the vicinity of this wavelength, since all fruits and vegetables contain chlorophyll. Since such a dip in the measurable reflectance is always present to a greater or lesser extent, there is present one point from which observations may be made.

Classification of object as to color may be provided where there is a simple means to describe, measure and classify their spectrophotometric curves. Illustrative of this situation is the assumed reference object, the lemon, which exhibits a wide range of surface color varying for different degrees of ripeness from dark green to yellow. Variances in color are divided into customary commercial categories of Dark Green, Light Green, Silver "A," Silver "B" and Yellow by suitably measuring and describing the reflectance curves of the different color classes.

The efficacy of such a system of classification depends largely on the nature of the particular criterion of color which is used to describe the difference in the spectrophotometric curves. Naturally, this measure of color should vary as greatly as possible from grade to grade in order that the different grades may be easily and precisely distinguished from one another. In this connection it is important to bear in mind, as will be presented by this description, that the ease of distinguishing between two quantities is made dependent upon their ratio or percentage difference rather than upon their arithmetic difference. This principle of determining ratio difference rather than arithmetic difference may for instance be appreciated by recognition of the fact that a current of one ampere and a current of three amperes may readily be distinguished from one another whereas a current of say 10,001 amperes and one of 10,003 amperes are difficult to distinguish even though there is the same arithmetic difference between them.

The criterion by which classification of objects, such as lemons, as to color can occur should accordingly preferably have characteristics classifying themselves into groupings somewhat as follows:

(1) The percentage variation should be as great as possible over the extreme range from the color groups "Dark Green" to "Yellow."

(2) The percentage variance should be in approximately equal increments between consecutive grades in order that satisfactory color differentiation can take place at all stages of maturity of the fruit.

(3) The measurement should be substantially independent of fruit characteristics, such as size and shape.

(4) The determination should be substantially independent of surface contaminants, such as wax, water and dirt.

(5) The measurement should be substantially independent of apparatus variables, such as the light source intensity, the sensitivity of the phototube, the gain of the amplifier, and so on.

If, in the consideration of this invention, it may be regarded, illustratively, that light occupying a narrow wavelength band extending into the general vicinity of 6780 A. is used to illuminate the object, such as the lemon, any phototube utilized to measure the light reflected from the object illuminated, such as the lemon, will have the output current flowing therefrom determined by the color of the object. It is desirable, however, in any operation, that the phototube current constitute a measure of the light reflected from the entire surface of the fruit, if a reasonably average color sorting is to be produced. Consequently, under these circumstances, the phototube response generally may be considered as a function of the size of the object illuminated. If the object being illuminated is a lemon, for instance, it can be appreciated that there is neither a perfect specular nor a perfect diffusing surface. In addition, the orientation of the object with respect to the phototube and the illuminating source of light would have a substantial effect upon the final end result.

Still further, any changes in the intensity or color of the illuminating light source or in the phototube sensitivity would be indistinguishable in the final output indication from any changes which might come about by reason of the changes in the color of the object being illuminated or the color of light illuminating it. In accordance with this invention, steps have been taken whereby such variables may, in effect, be nullified.

One of the steps by which this may be brought about is that the object to be viewed is first illuminated by light of one wavelength, and then later the illuminating light is of a different wavelength. The band of wavelengths (frequency range) over which illumination occurs is but a minor fraction of the complete visible spectrum. The range between minimum light wavelength to maximum light wavelength also is usually only a part of the wavelength range of the visible spectrum. Limiting wavelengths of light may, however, lie even slightly beyond the visible wavelengths, if desired, as will be appreciated from the description to follow. In each instance measurement of the reflected light is made as a result of the photoelectric current which is developed by the light which reaches appropriately positioned phototubes arranged in the path of the light reflected from the object. The ratio of the photoelectric outputs for the different conditions then can be regarded as generally independent of those factors which have the same reference at each wavelength of illuminating light. Accordingly, the output, under such conditions, may be regarded as one way by which color can be measured and determined.

A suitable measurement of the ratio of any two voltages or currents, however, requires a modulating device. Generally speaking, modulating devices are not reliable in their operation at extremely low input levels. If the results are to be accurate to a high degree, the band of light or the wavelength under which the object is illuminated must be, of necessity, quite narrow, and, under such circumstances, the production of a sufficient intensity of light to provide, generally speaking, high level output current from a phototube subjected to reflected light from the object would require both a large and an expensive optical apparatus. In addition, if an attempt were made to obtain the output from two separate phototubes responsive individually to light of one color or wavelength, and then an attempt were made first to amplify their separate outputs and then to measure the ratio of their outputs, the problem of providing a constant gain in the two completely separate phototube and amplifier channels would be found to become particularly formidable, and almost unsolvable in any reasonably priced apparatus.

In addition, it will be appreciated that if the fruit to be tested more closely approaches a mature state, a fundamental difficulty with the last-described forms of measurement would come into being, because of the relatively low change in the measured quantity output. For instance, as will be pointed out more particularly in the specification to follow, the ratio of change between the reflectance for a completely ripe or mature yellow lemon, and one which is of a silver B state, is only of the order of about ten percent at an illuminating wavelength of approximately 6780 A. If, on the other hand, the ratio of reflectance measured with illumination at about 7200 A. and approximately 6780 A. be considered, it will be found that the value of this ratio is only slightly more than nine percent greater for a lemon in the silver B state than for one in the completely ripe state.

Under the circumstances, it is practically impossible to keep the aggregate change in the various factors affecting the measurement sufficiently small in comparison with these changes, where the measurements are made at extremely low level, to make a system of the foregoing type of any considerable utility. The present invention herein to be described therefore may be regarded as one which approaches the problem from a slightly different aspect. If it becomes possible to arrange the object to be tested so that it can be illuminated with light in a narrow band of wavelengths, which occupies only a relatively small portion of the visible spectrum, and if these illuminating light rays can be shifted from some minimum selected value up to and including a maximum selected value, the problem of object dimension and orientation can be made ineffective so that the making of measurements by relatively simple and highly stable means becomes feasible.

Considering, for instance, that the illumination may be caused to occur in narrow spectral bands which are selected in any desired portion of the spectrum between suitably selected minimum and maximum wavelengths, the difference in reflectance at each of the two selected values may readily be determined. Against this there may be determined the ratio of the different values and the average reflectance throughout the region over which the computations take place. This may be considered as a criterion of color which will herein be termed "Index of Variation of Reflectance," hereinafter frequently abbreviated "IVR." In the description to follow it will be utilized to describe the particular system and apparatus in question. This factor, as will be seen in what is to follow, may be looked upon as being dimensionless, since it will be seen that it is the ratio of two similar dimensions.

For purposes of explanation herein the range of shift will be described as between approximate red (about 6800 A.) and the near-infra-red range (about 7200 A. to 7400 A.). These are purely illustrative of the principle, although they are representative of practical values useful in lemon sorting.

With this explanation the apparatus herein to be described as constituting one form which the invention may assume involves, generally speaking, a light source capable of producing light of relatively constant intensity over the wavelength or band under consideration. This band of the spectrum is then broken up into extremely narrow wavelength bands which individually are utilized to illuminate the subject. The narrow wavelength bands over which the object is illuminated are caused to shift back and forth by any appropriate means from a minimum to a maximum wavelength within the selected spectral band under consideration. For many practical reasons the wavelength instantly effective to illuminate the subject may be considered to oscillate according to generally simple harmonic motion. It is, however, possible to shift according to other patterns, such as a sawtooth. The simple harmonic motion, however, makes possible the use of circuit simplifications which later will be appreciated.

During the course of the shift in the wavelength of light in which the subject or object is illuminated, it is also possible to interrupt the light in such a way that it is revealed and eclipsed at a rate which is high relative to the general shift operation. This method also tends to simplify circuitry but, as will hereinafter be set forth, alternative and equivalent operations may be used if desired.

When the object is illuminated by light of such character the light reflected therefrom is directed into a multiplicity of phototubes which are grouped about the object so as to receive light reflected from various angles. These phototubes are arranged to operate at voltage saturation so that the current output is a measure of light input and one does not load the other. They are parallelly connected outputs so that the output currents flowing as a result of the illumination represent the cumulative effect of light reaching all of the phototubes. Under the stated circumstances the combined phototube output current rises and falls at the rate at which the light in each narrow band of the spectrum is eclipsed and revealed.

The phototube output is loaded with a tuned circuit. The voltage developed across this tuned circuit will be one which, generally speaking, contains three principal frequency components. One of these frequency components, in the illustrated example, is the carrier component at the frequency at which the illuminating light source is revealed and eclipsed. The other two components are sideband frequencies removed from the carrier component by frequency separations corresponding to the frequency of shifting the illuminating light between the different ends of the spectrum. It is desirable that the tuned circuit impedance be relatively high and constant at the light chopping frequency plus or minus the sidebands.

The percentage of modulation of a wave of this type thus can be regarded as the ratio of the amplitude of the sinusoidal envelope to the average value of the envelope ordinate. From what has been above stated, it will be appreciated that this ratio is then, in turn, proportional to the "Index of Variation of Reflectance" (IVR) of the object illuminated.

Various forms of circuitry to bring about this control effect may be utilized. According to the invention herein to be set forth, provisions are made for directing the light-exposed objects or fruit into different containers or bins, in accordance with the actual ripeness or maturity of the fruit examined as a result of sorting possibilities determined by the measurements of the Index of Variation of Reflectance.

With these thoughts in mind, it is one of the principal objects of this invention to provide a sorting apparatus and associated circuitry which will discriminate between objects having relatively minor apparent color differences, but which are, nonetheless, subject to segregation with respect to each other.

Other objects of the invention are to provide a sorting apparatus which is substantially free from dependence for accuracy upon general similarity of object shape, surface characteristics, orientation and the like, to say nothing of freedom from dependence on uniformity of response of different phototubes or therewith associated amplifier components.

A further object of this invention is that of providing apparatus for illuminating objects to be sorted in such a way that the complete object surface is illuminated. By measuring the illumination of substantially all surfaces of the object and integrating the measured values the average surface state of the complete object is descernable.

Still other objects of the invention are to provide sorting apparatus capable of providing segregation of objects in accordance with color, in which the overall calibration is easy to obtain and yet the overall optimum accuracy is obtainable even with minor color differences only in the objects under test.

Other objects of the invention are to provide a sorting apparatus in which an improved operation is obtainable at a minimum of expense and which, nonetheless, in its functioning operates at speeds greater than those heretofore known in the industry.

Still other and further objects and advantages of the invention will become apparent from the following description, read in connection with the accompanying drawings, and hereto appended claims.

Considering the drawings, Fig. 1 shows typical spectrophotometric reflectance curves for lemons of five commercial classes: Dark Green, Light Green, Silver "A," Silver "B," and Yellow, at wavelengths of illumination varying between 4000 A. (Angstroms) and 7,400 A. (Angstroms);

Fig. 2 is a series of curves representing the signal level output in decibels (db) from a phototube plotted against color grade for three systems of lemon color measurements, showing that percentage-wise according to one system of measurement a minimum change takes place in that grade of lemon which is approaching maturity, while according to a second system of measurement the major portion of that change takes place near maturity but little change occurs in the darker grades, and by a third system following a curve which is known as the "IVR" it is generally linear throughout;

Figure 13:
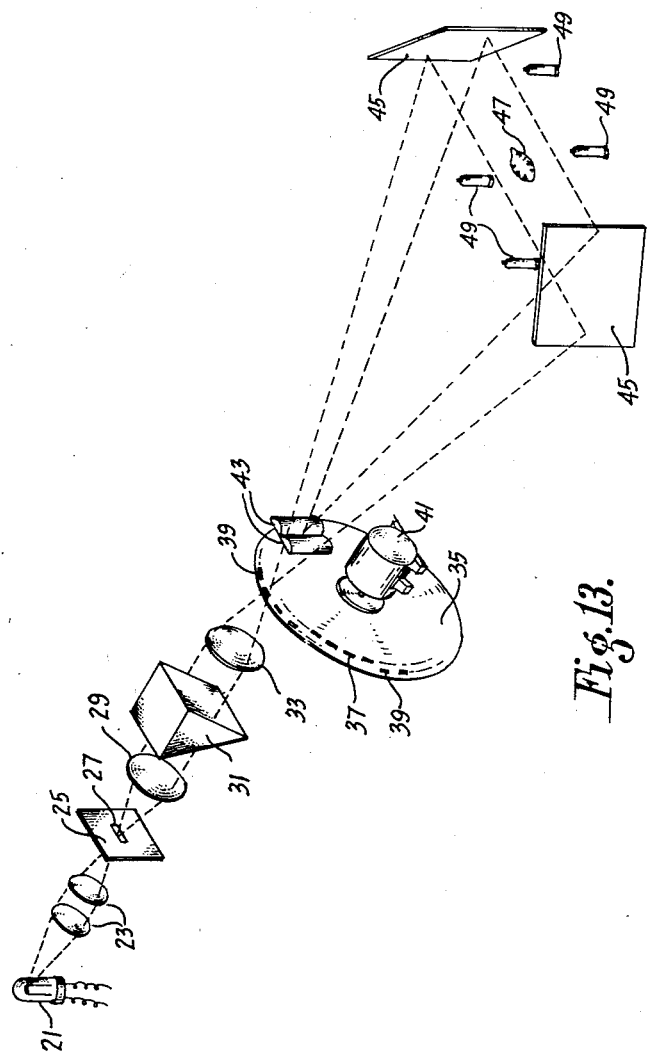
Figure 14:
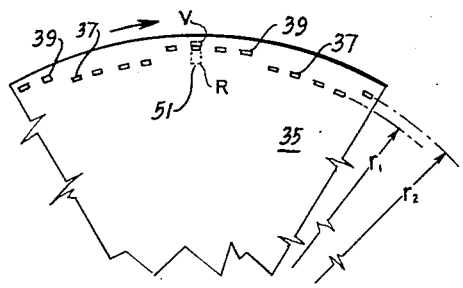
Figure 15:
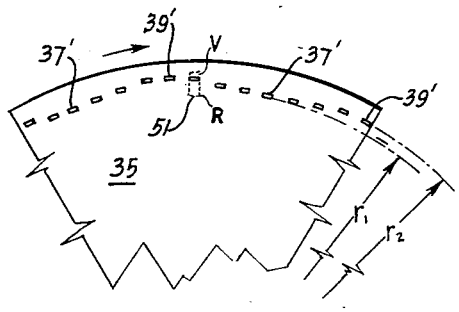
Figure 16:
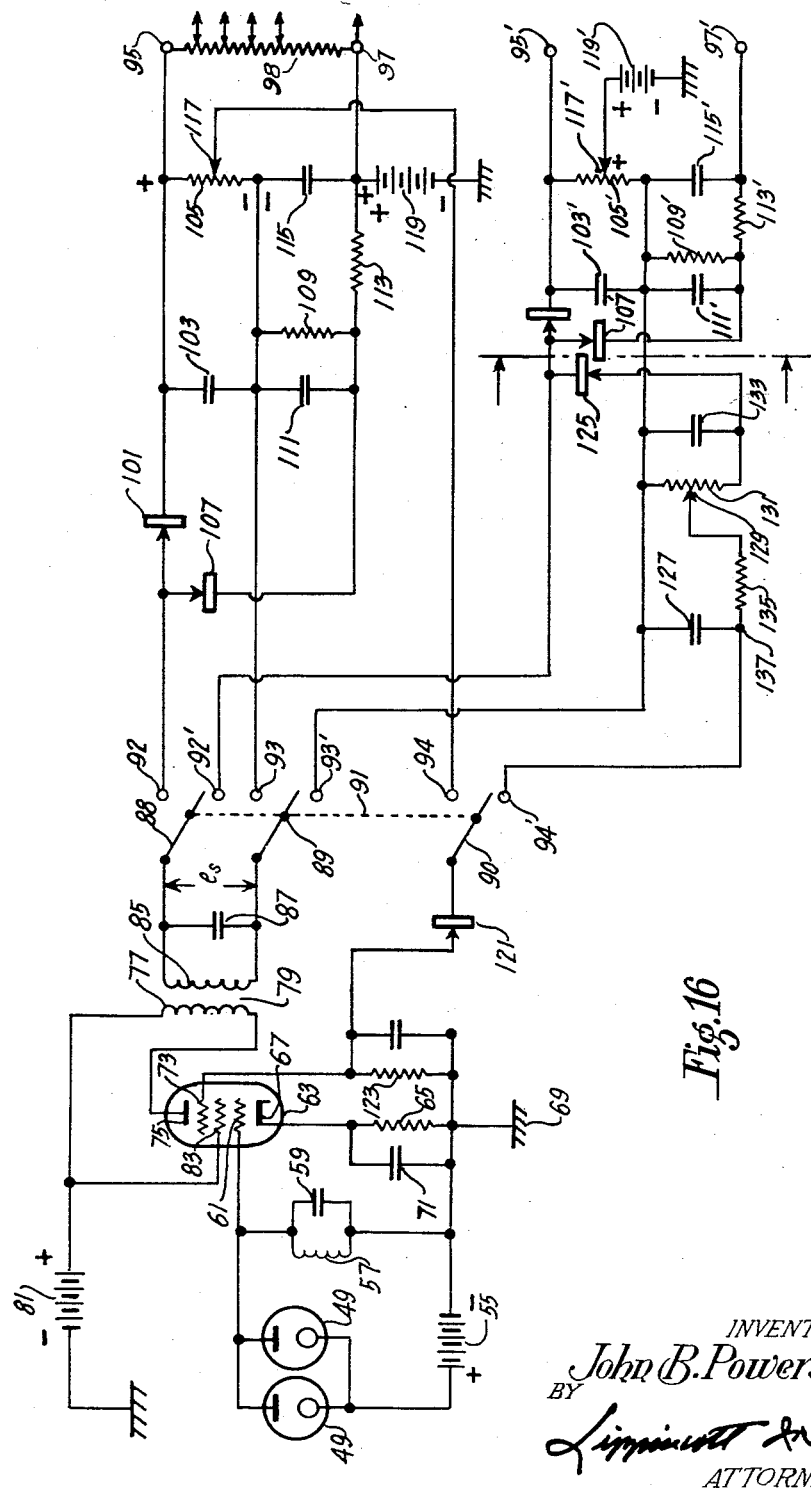
Figure 17:
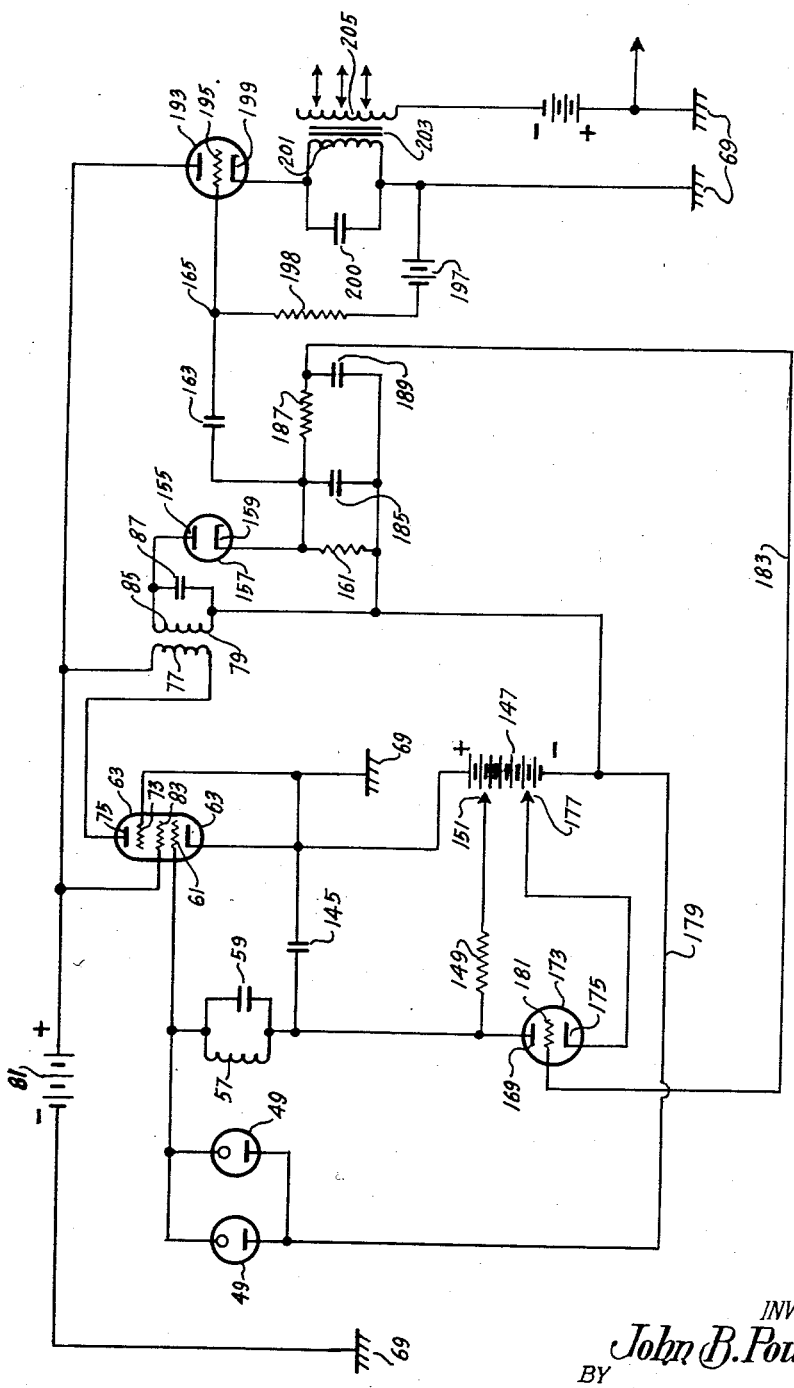

Figs. 5 through 12 inclusive are curves for the purpose of explaining the operation;

Fig. 13 is a schematic showing of one form of apparatus for object illumination;

Figs. 14 and 15 depict sections of a light revealing and eclipsing (light chopping) component to provide object illumination useful for different forms of operation herein to be disclosed;

Fig. 16 is a circuit diagram to explain electrically the apparatus by which different signal outputs are derived in accordance with the character of object illuminated; and Fig. 17 is a modified circuit particularly adapted for one selected condition of operation where the Index of Variation of Reflectance is selected as the ratio of the difference in light reflectance at the two selected extreme wave lengths to the average reflectance at the same two reflected wave lengths.

Figure 1:
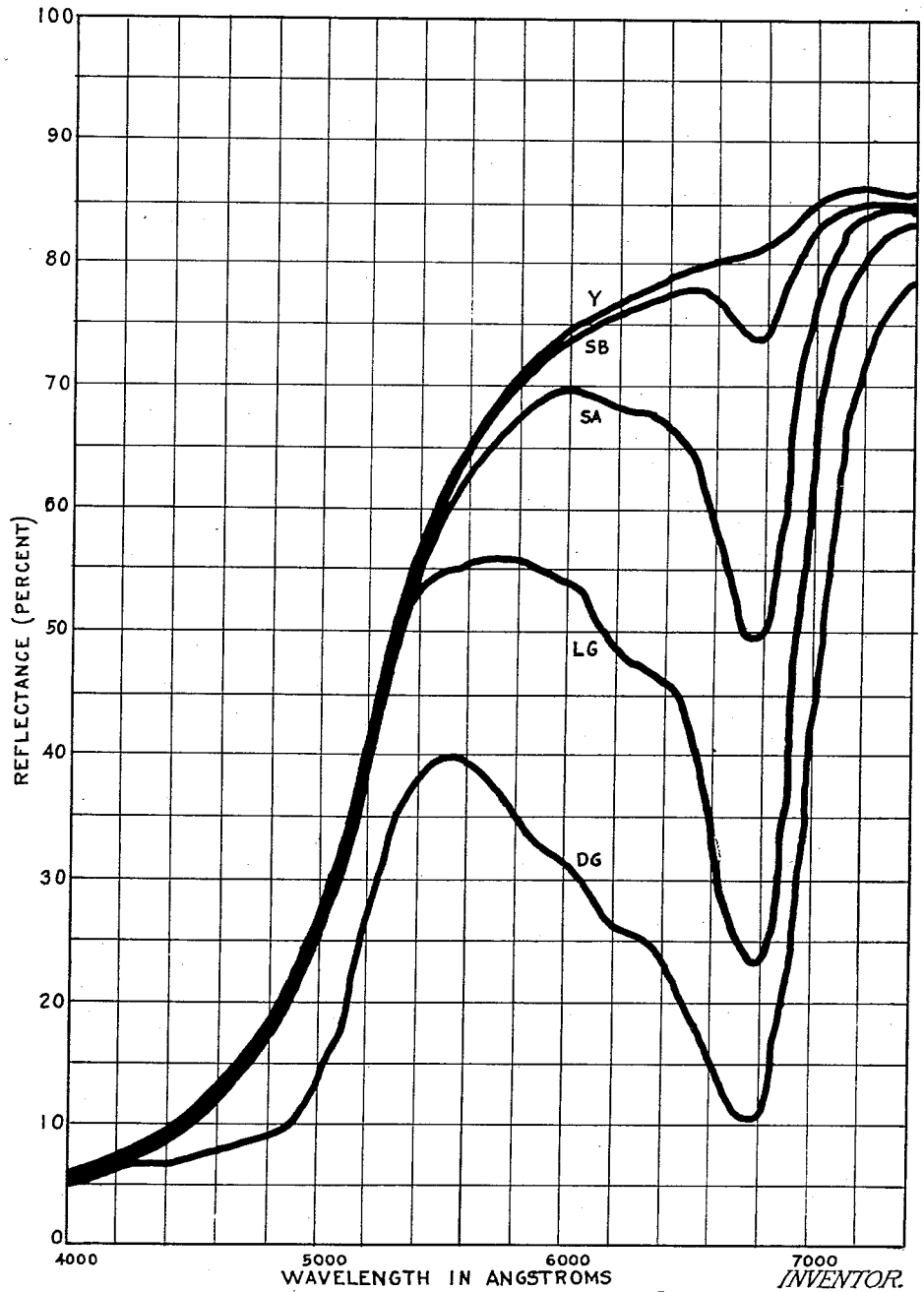

Referring first to the drawings and to the curves of Fig. 1, the curve labeled "DG" represents the reflectance in percent plotted against illuminating light wave length (in Angstroms) for a Dark Green lemon. The curve "LG" is a similar curve for a Light Green lemon. Curves "SA" and "SB" are similar curves for lemons of the varieties known as Silver "A" and Silver "B," while the curve "Y" is for a Yellow lemon. This last discussed curve is indicative of that obtained by illuminating a lemon which has reached its ripe or mature state.

In all of these curves the reflectance is plotted against wave length of illuminating light in Angstroms with the illumination selected between wave lengths corresponding to 4,000 A. through 7,400 A.

The value and advantage of the IVR measurement of color is best appreciated by considering three different approaches to color measurement. Of these various proposals the first method may be considered as one of such character that if reflectance at a single wave length is chosen as the criterea of color a value of about 6,800 Angstroms would be indicated as the best suitable wave length because the percentage change in reflectance between Dark Green and Yellow fruit is approximately a maximum at this point. The change in reflectance (in db) or percentage units from grade to grade is shown particularly by curve "A" of Fig. 2. However, this condition may be computed according to the following table:

| Grade | Reflectance at 6,800 A. | Ratio of Successive Grades | db Change Grade to Grade (20 Log₁₀ Ratio) |
|---|---|---|---|
| Dark Green | 10 | | |
| | | 2.30 | 7.24 |
| Light Green | 23 | | |
| | | 2.17 | 6.74 |
| Silver "A" | 50 | | |
| | | 1.46 | 3.28 |
| Silver "B" | 73 | | |
| | | 1.11 | 0.90 |
| Yellow | 81 | | |

Figure 2:
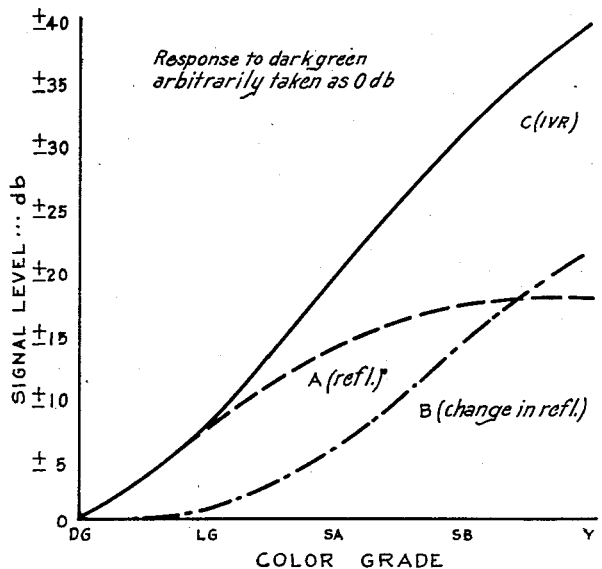

From the foregoing table and considering the curve on Fig. 2 marked as A it can be seen that this curve changes to such a small degree in the range between the Silver "B" and Yellow grades that satisfactory commercial separation becomes extremely difficult as fruit maturity is approached.

Considering another method by which a measurement of color may be made, the rise of the reflectance curve between illuminating wavelengths of light between 6,800 Angstrom and 7,200 Angstrom may be considered. Illustratively, the reflectance may be measured first with the illumination occurring with light of 7,200 Angstrom and then at 6,800 Angstrom. The second reading is then subtracted from the first to provide information relative to the reflectance difference. Following this procedure provides a measure of the rising characteristic of the curve in the region between 6,800 Angstrom and 7,200 Angstrom with the result represented by the curve identified as "B" in Fig. 2. The change in color quantities by which this type of curve is arrived at in the illustrated example is determined in accordance with the following readings, all referred to Fig. 1:

| Grade | Reflectance at 6,800 A. | Reflectance at 7,200 A. | Reflectance at 7,200 A. minus Reflectance at 6,800 A. | Ratio of Successive Grades | db Change Grade to Grade (20 log₁₀ Ratio) |
|---|---|---|---|---|---|
| Dark Green | 10 | 71 | 61 | | |
| | | | | 1.07 | 0.60 |
| Light Green | 23 | 80 | 57 | | |
| | | | | 1.67 | 4.48 |
| Silver "A" | 50 | 84 | 34 | | |
| | | | | 2.83 | 9.04 |
| Silver "B" | 73 | 85 | 12 | | |
| | | | | 2.40 | 7.60 |
| Yellow | 81 | 86 | 5 | | |

From a consideration of the curve "B" of Fig. 2 it is evident that the second color criterion does not change sufficiently between the Light Green and Dark Green to permit a truly commercial separation.

Since the rise of the reflectance curves following the second method of measurement, above described, changes greatly among the yellower grades of the lemons and the reflectance assumed 6,800 Angstroms in the greener grades of the lemons does likewise, there is provided according to this invention ways and means by which the ratio of the rise of the curves to the reflectance at 6,800 Angstroms can be used to show a more uniform rate of change from Dark Green to Yellow than by either above described method by itself. This quantity, which herein may be considered as the color criterion, is what will be referred to herein as the "Index of Variation of Reflectance" or as "IVR." According to this proposal the db change from grade to grade with the curves of Fig. 1 may be calculated from the table to follow and then plotted as the curve "C" in Fig. 2. These values, considering Fig. 1, may be the following:

| Grade | Reflectance, 7,200 A. minus Reflectance, 6,800 A. | Reflectance, 6,800 A. | IVR Ratio, Column 1 to Column 2 | Ratio of IVR, Grade to Grade | db Change in IVR Grade to Grade (20 log₁₀ Col. 4) |
|---|---|---|---|---|---|
| Dark Green | 61 | 10 | 6.1 | | |
| | | | | 2.46 | 7.82 |
| Light Green | 57 | 23 | 2.48 | | |
| | | | | 3.65 | 11.24 |
| Silver "A" | 34 | 50 | 0.68 | | |
| | | | | 4.14 | 12.36 |
| Silver "B" | 12 | 73 | 0.164 | | |
| | | | | 2.66 | 8.5 |
| Yellow | 5 | 81 | 0.0617 | | |

Referring now to Fig. 2 it will be observed that the db change in IVR between Dark Green fruit and Yellow fruit is approximately twice as great as the change in either rise or reflectance. Further than this, the change in IVR from grade to grade is substantially uniform, which is depicted by the fact that the curve "C" of Fig. 2 approximates a straight line.

Bearing in mind the fact that IVR as a measure of color is generally useful in any region of the spectrum it will be apparent that where the reflectance curves of the objects to be sorted exhibit a decrease in slope with an increase in reflectance (and, of course, vice versa) as is evident from the curves of Fig. 1 the IVR may readily be determined and plotted. In the determination of the Index of Variation of Reflectance (IVR) the numerator of the fraction, for example, the rise of the reflectance curve, will then vary in an inverse fashion with the denominator of the fraction, for example, an ordinate of the reflectance curve. Under these circumstances the IVR will change from grade to grade (still assuming the objects to be sorted are lemons) at a greater rate than either the rise or the ordinate. While it has been mentioned above that the IVR represents a dimensionless quantity it is of worthwhile importance in the consideration of this invention to bear this fact in mind in connection with the more detailed discussion to follow.

The Index of Variation of Reflectance (IVR) is a function which may be generally considered at two points on the reflectance curves. In a strictly mathematical sense, of course, the reflectance of an object cannot be measured at one single wave length due to the practical impossibility of isolating light of a single wave length. Consequently, while the reflectance measurements herein to be discussed are actually made over a finite band of wave lengths, which is a preferably extremely narrow band of the spectrum, the reflectance in the region under consideration herein will always be construed to mean the average reflectance within the particular selected band. The optimum band width in any particular case is determined by the shape of the reflectance curves and by various apparatus considerations. The actual shape of the curve between the two points selected may be considered as not affecting the value of the IVR.

From the numerical examples hereinbefore set forth the IVR has been defined tentatively as a fraction in which the numerator is equal to the rise in the reflectance curve between the selected and prescribed limits. The denominator of the fraction is equal in value to the lower of the two reflectances at these two limits. From what is to follow herein it will also be shown that the denominator of the fraction may be made equal to the higher reflectance or to some quantity interpolated between the higher and lower reflectance (for instance, the average reflectance) while still retaining many of the advantages of this color criterion.

Viewing the Index of Variation of Reflectance (the IVR) according to this broad definition, it can be expressed perhaps best in a concise mathematical form. To this end reference may be had illustratively to the curve of Fig. 3 wherein reflectance in percent is plotted against illuminating light wave length. To illustrate principlewise the invention the heavy outline curve is assumed to result. It should, however, be appreciated that this curve is purely illustrative and is in no way intended to represent in any precise fashion the reflectance from any particular object. It is for this reason that the curve is shown illustratively with relationship to a straight line function (designated by the dash line) and in such fashion that a portion of the curve is relatively steep, then the curve levels off and increases in steepness at a moderate rate, after which there is a gradual decrease in slope prior to a final rise. Referring to this figure and its illustrative curve the value indicated as $R_1$ may be regarded as the average reflectance of an object, such as a lemon, in a finite region of the spectrum such as in the vicinity of 7,200 A. The value $R_2$ may be considered as the average reflectance of the same object in a second finite region of the spectrum, such as a 6,800 A. For the purpose of this explanation it may be assumed that $R_1$ is greater than $R_2$. Following the analysis from Fig. 3 it will be evident that the rise or increase in percent in reflectance is determined by the difference in reflectance at the two selected points and thus, illustratively, by the quantity $(R_1-R_2)$. A value interpolated between $R_1$ and $R_2$ may be expressed as the quantity $R_2+k(R_1-R_2)$, where $k$ is an arbitrarily chosen number in the range between 0 (zero) and 1 (unity), each inclusive. Consequently, the IVR with respect to two regions of the spectrum may be defined broadly as $$\frac{R_1-R_2}{R_2+k(R_1-R_2)}$$

This fraction can be written also as $$\frac{R_1-R_2}{kR_1+(1-k)R_2}$$

where $k$ is an arbitrarily chosen number or parameter whose value lies between 0 and 1, each inclusive.

It is possible to illustrate several examples of the determination of the Index of Variation of Reflectance (IVR) assuming certain specific values for $k$ which under some conditions may make the meaning of the formula hereinabove outlined even clearer. If, for instance, the value of $k$ is assumed to be zero (0), then the Index of Variation of Reflectance (IVR) will be found to equal $$\frac{R_1-R_2}{R_2}$$

This condition would be representative of the case in the illustrative computations hereinabove proposed where the ratio represents the rise of the reflectance curve to the minimum ordinate.

Considering now a condition where the value for the constant $k$ is assumed as unity (1), it will be seen that $$IVR=\frac{R_1-R_2}{R_1}$$

In this instance the ratio represents the rise to the maximum ordinate.

In the third condition, the value of $k$ may be assumed as ½, in which case $$IVR=\frac{R_1-R_2}{\frac{(R_1+R_2)}{2}}$$

In this last considered case the IVR represents the ratio of the rise to the arithmetic average of the maximum and minimum ordinates.

From what is stated it will be apparent that other values between zero (0) and unity (1) can be assumed for the constant $k$, but it may be noted that where the value of $k$ is assumed at zero it generally yields the greatest db change in IVR from grade to grade and consequently may generally be recognized as being the most sensitive measure of color. Circuitry for determining measurements according to the foregoing proposal is diagrammatically illustrated by Fig. 16, although modifications thereof are possible and within the scope of this invention. As an illustration of a condition where the value of $k$ is assumed as equal to ½, the operating conditions may in some cases be simplified and other forms of measuring circuitry adopted, as will be explained in connection with the circuitry shown diagrammatically in Fig. 17.

Figures 3, 4:
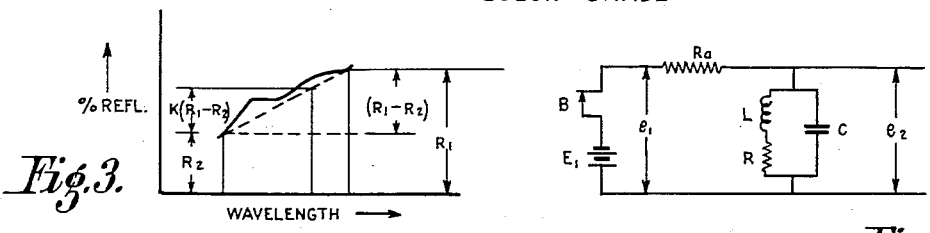
Fig. 3 is a curve to indicate one way in which measurements are made.
Fig. 4 is a schematic circuit diagram to indicate principlewise the nature of the operation.

From what has been stated up until this point and in view of the fact that the determination of the Index of Variation of Reflectance (IVR) represents the use of such devices as light sources, phototubes, amplifiers, and the like, all of which, it will be appreciated, are subject to some unstable characteristics at times, it is desirable to consider components of this nature as variables. If this be done, these variables affect the measurement of the Index of Variation of Reflectance. It is evident from the established formula $$IVR=\frac{R_1-R_2}{R_2+k(R_1-R_2)}$$

supra, that the means for measuring IVR will include a suitable means by which a signal, such as a voltage or a current, can be produced which is proportional to a reflectance, such as that measured by the value $R_1$ on Fig. 3, for instance. Next, there must be a suitable means for producing a signal of a similar nature which is in like porportion, that is, the same constant of proportionality, to the reflectance measured by the value $R_2$ on Fig. 3, for instance.

In addition, it is essential that the two signals thus produced be combined in the relationship shown by the formula to produce a third signal which, in turn, will be a measure of the Index of Variation of Reflectance (IVR). It can be seen from what is stated that either $R_1$ or $R_2$ appears in each term of the numerator and the denominator of the formula supra. Accordingly, if the values $R_1$ and $R_2$ are multiplied by any quantity, that quantity may be canceled from the numerator and denominator but the value of the IVR fraction will remain unchanged. Under the circumstances if each quantity of the formula be multiplied by some constant of proportionality which defines the ability of the measuring apparatus to produce a signal from a surface of unit reflection (that is, a 1% reflectance) if the two signals are combined as indicated by the formula and each of the numerator and denominator is then divided by the constant one arrives again at the formula shown supra, where the condition $(0 \leqslant k \leqslant 1)$ holds. It is important to bear this feature in mind because it makes evident the fact that the value obtained for the IVR is independent of the sensitivity of the system by which it is measured so long as the sensitivity is the same at the two measuring wave lengths.

It is difficult and unnecessary to design apparatus that has uniform sensitivity over even a small band of wave lengths. In practicing the present invention, even though the sensitivity be substantially different at the two selected measuring wave lengths (such as to reach the values designated at $R_1$ and $R_2$, for instance, in Fig. 3) it is clear nonetheless than an overall calibration of the apparatus will result in a suitable classification of the fruit or object to be sorted even though the IVR, as above defined, has not been accurately measured.

When the system is once calibrated it will be independent of any variable factor which has the same effect at the two wave lengths. The result is that the so-called IVR fraction, as will herein be more particularly set forth from the consideration of the apparatus by which the invention is to be practiced, will be shown to be independent of such variables as light source intensity, phototube sensitivity, amplifier gain, and so on, which determine the sensitivity of the measuring apparatus. Further than this, it will be apparent that the value of IVR becomes independent of such factors as fruit size and moderate surface contamination, such as dirt, moisture and the like, so long as these factors have the same effect at the two wave lengths at which the measurements are made. This makes the measurement of IVR a criterion of color measurement in itself rather than simply a convenient way to measure reflectance.

In order to practice the invention broadly outlined above it will be seen that the first formula herein set forth both suggests and indicates the necessity of arriving at a subtraction of two measured voltages to form the numerator and an addition of two voltages to form the denominator. Either proposal may be readily brought about electrically in accordance with what is herein to be stated and through the use of known components forming the complete apparatus. However, the invention as herein to be set forth and the circuit and apparatus by which it is to be practiced involves beyond such measurements the accurate determination of a ratio of two resultant voltages expressed by the numerator and denominator of the fraction where the voltages are utilized in circuits operating at low power level. According to this invention these voltages may be associated with circuits operating at reasonably high power level or individually amplified prior to making the ratio measurement.

While specific apparatus and circuitry will be discussed at a later point herein it is desirable for the purpose of understanding this invention first to consider a schematic circuit for showing broadly the problem involved. In referring to Fig. 4 the components shown as the inductance L, the resistance R arranged in series therewith and each shunted by the capacity C indicate generally a resonant or tuned circuit. The resistance $R_a$ shown in this circuit is made large in comparison with the parallel impedance of the resonant circuit. A constant source of voltage is designated at $E_1$, while the schematically represented pair of contactor or breaker points provide an illustrative mechanism for interrupting the connection of the source indicated $E_1$ to the circuit as a whole. With an alternate opening and closing of the breaker points B there will be produced within the circuit, as designated by the voltage $e_1$, a series of square or rectangular wave-form pulses more particularly shown by diagram in Fig. 5. Each of these pulses represents an amplitude $E_1$ corresponding to the source. The repetition rate of these pulses is made substantially equal to the resonant frequency of the tuned circuit including the inductance L, the resistance R and the capacity C, with the result that there is produced across the resonant circuit a voltage wave designated $e_2$, which is shown schematically in Fig. 4. While it is evident that the voltage pulses $e_1$ which are developed are unidirectional, the voltage designated as $e_2$ has substantially no D.C. component. As is evident in the showing of curve at Fig. 6 amplitude of the oscillating voltage across the resonant circuit of Fig. 4 increases exponentially with time and this has been shown by the dotted envelope in Fig. 6 as approaching a limiting value $E_2$. The voltage $E_2$ is directly proportional to the voltage of the source $E_1$ with the constant of proportionality being a function of the circuit parameters.

Figure 6:
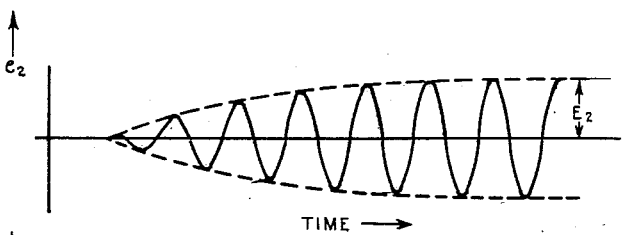
Figure 7:
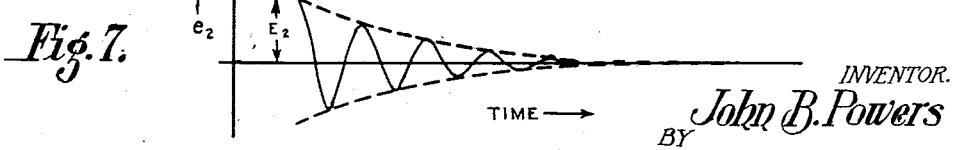

Under these circumstances, if the resonant circuit of Fig. 4 is excited for a sufficient time period to permit the amplitude of the voltage designated $e_2$ (see Fig. 4) to attain substantially the value shown at $E_2$ in Fig. 6 and the breaker points B are then opened, the voltage $e_2$ will decay along a substantially exponential curve, as has been designated by the voltage curve of Fig. 7.

Figure 5:
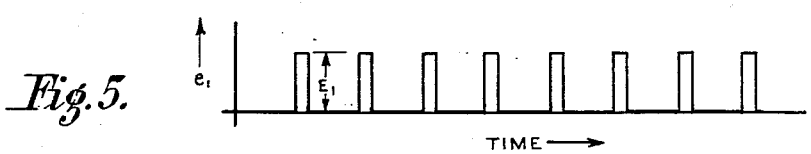
Figure 8:
Figure 9:
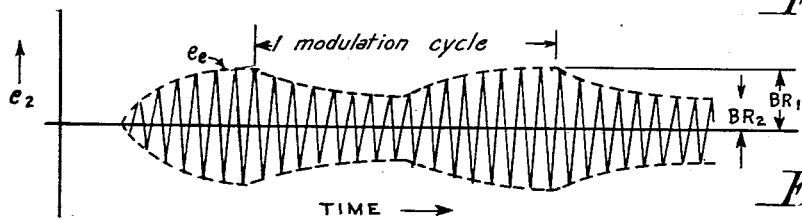

Now making reference to the curves of Figs. 8 and 9 for the purpose of relating the foregoing discussion to a particular set of conditions, and bearing in mind the foregoing reference to the formula above discussed, one can assume that the voltage represented, as in Fig. 5, by the value $E_1$ may be assumed as some specific value represented in Fig. 8 as $AR_1$. Under these circumstances, and considering the illustrative example of circuitry shown by Fig. 4, the breaker points B may be open and closed and the amplitude of the voltage across the resonant circuit LRC (Fig. 4) represented by the value $E_2$ attains the substantially steady value $BR_1$ (see Fig. 9) which is proportional to the voltage $AR_1$ in Fig. 8. Following the same analogy, if the voltage shown at $E_1$ in Fig. 5 shall assume a second lower value indicated in Fig. 8 as $AR_2$ and the breaker points at B of Fig. 4 shall continue to operate for an equal period of time until the amplitude of the voltage $e_2$ (see Fig. 9) attains a substantially stable value $BR_2$ (which is in like proportion to the voltage $AR_2$ of Fig. 8) the curve shown by Fig. 9 will result. The cycle may be continued by returning again to the voltage value $E_1$ or the proportional voltage $AR_1$, and then repeating the cycle.

For conditions of this character the voltage $e_1$ is depicted graphically by Fig. 8 and the voltage $e_2$ which developed across the tuned circuit LRC (see Fig. 4) is represented by Fig. 9. From these conditions it will be observed that the maximum voltage indicated in Fig. 9 as $BR_1$ is proportional to the voltage $AR_1$ (see Fig. 8) and the minimum amplitude of the developed voltage $e_2$, which is represented in Fig. 9 as $BR_2$, is proportional to $AR_2$ in like relationship as in Fig. 8.

The voltage wave indicated by the various values $e_2$ accordingly provides a signal with three important properties. One such property is the provision of a signal having maximum and minimum instantaneous amplitudes which are distinguishable and measurable one from the other and which are in like proportion to the voltages assumed as the initial exciting voltages. The second property is that the signal developed has substantially no D.C. component so that it can be amplified in an A.C. amplifier without materially changing or altering its form. The third important property of the signal developed is that after amplification the maximum and minimum amplitudes of the signal will still be distinguishable and measurable and will still retain similar proportions to the assumed values of the initial exciting voltage. It is with a signal having the foregoing properties that the Index of Variation of Reflectance can readily be measured.

Referring back to Fig. 4, it will be seen that the voltage source $E_1$, which is in series with the resistance $R_a$, may be considered as an equivalent circuit of a photo electric device. The voltages $AR_1$ and $AR_2$, as shown by Fig. 8, may be considered as the similarly designated voltages considered in the formula for measuring IVR, discussed above, and they can be considered as proportional to the reflectance referred to in the curves of Fig. 1 or Fig. 3. An effect which is intended to be simulated by the opening and closing of the breaker points B of Fig. 4 may be provided when the photoelectric effect is being considered through the use of an appropriate mechanism to interrupt the illumination reaching the photo-tube or by interrupting the output from the photo-tube where it is illuminated by uninterrupted light of selected wave length. In either event the modulated carrier signal which has been depicted schematically by the curve of Fig. 9 will have a maximum amplitude, it will be observed which is proportional to the reflectance designated on Fig. 3 by the value $R_1$ and it will have minimum amplitude which bears a similar proportionality to the minimum reflectance designated as $R_2$ in Fig. 3. The signal which has thus been developed is one in which the amplitude of the carrier varies and which may be amplified by any generally conventional form of A.C. amplifier and still preserve the identity of both the reference reflectances $R_1$ and $R_2$.

In considering the schematic references of the preceding discussion the principle upon which the invention is based is illustratively explained by assuming generally rectangular or square pulses of voltage. It must, however, be borne in mind that within the concept of the invention it is intended that these voltage pulses may have any convenient wave form without in any way departing principle-wise from what is intended herein to be expressed. It is known that the ability of a pulse to excite a resonant circuit, such as that designed by the inductive, capacitive and resistive elements L, C, and R in Fig. 4, is determined by the impulse value of the exciting pulse. This measurement of the impulse value of the voltage pulse, as is well known, is the product of the average value of the voltage during pulse period multiplied by the pulse duration. To practice this invention it is not necessary that the pulses shown as $AR_1$ and $AR_2$ shall have precisely the same wave form but it is important and necessary that the impulse values of the exciting pulses shall be in substantially like proportion to the reflectance at the wave lengths selected for illumination and herein illustrated as represented by the reflectance values $R_1$ and $R_2$.

In the consideration above the Index of Variation of Reflectance was explained as a fraction and various conditions for its determination were generally set forth. It has also been set out generally that to classify objects according to their color and to follow the principles of classification herein to be set forth the different values which the IVR fraction may assume for different color grades are measured and compared. According to this invention, in one of its forms, provision is made for providing the effect of reducing the fraction to a common denominator for comparison purposes.

In order that the relative values of the fractions can be measured by the values shown by the denominator of the fraction only, a further scheme to make such a comparison is to provide apparatus and circuitry to reduce the fractions to a common numerator in which case the denominators alone establish an inverse measurement of the value of the fractions. For the purpose of illustrating the present invention in a preferred form provision will be made herein for reducing the fractions to a common denominator, with it being appreciated that both forms of comparison fall fully within the spirit and scope of what is herein disclosed and follow from the principles herein explained. For this reason the circuitry herein later to be discussed will be the specific form adopted for one form of comparison with modifications of other circuitry to follow the same broad principles of circuitry.

Considering for instance the modulated wave schematically shown by Fig. 9 it will be recognized that two characteristics which can be readily measured are established from it. One of these characteristics is that of an indication of the peak value which the wave assumes and the other characteristic is that of the average ordinate to the envelope of the wave. The circuitry herein to be explained in detail will provide a means whereby the signal which is representative of the Index of Variation of Reflectance (IVR) can be obtained as a result of two measurements of such character.

Figure 10:
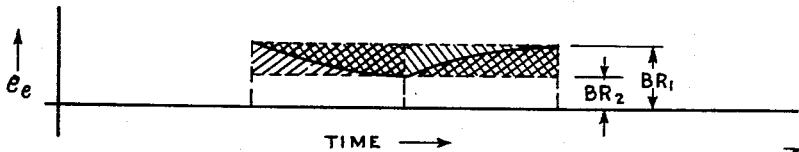

To this end consideration may be given to the curve diagrammatically shown by Fig. 10. This represents one cycle of the wave represented by the voltage $e_e$ which, in turn, corresponds to the voltage represented as $e_2$ for the wave of Fig. 9. It will be recognized that the shape of the two halves of the envelope represented in Fig. 10 will be similar provided the number of pulses, such as those shown in Fig. 8 as $AR_1$ and $AR_2$ are equal. Under these circumstances the singly and doubly cross hatched areas shown above and below the curves are respectively equal and the average ordinate to the curve accordingly is midway between the maximum and the minimum ordinates.

Figure 11:
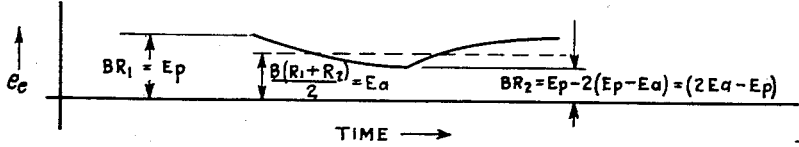
Figure 12:
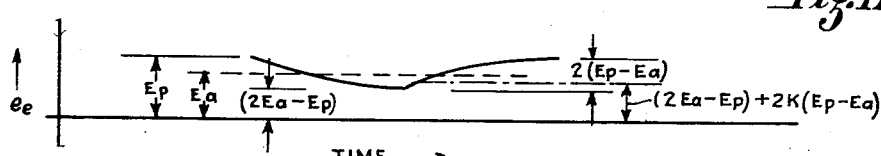

In Fig. 11 the upper half of the envelope of the wave $e_2$ of Fig. 9 is reproduced where the voltage $E_p$ represents the peak voltage (designated in Fig. 9 as $BR_1$) and the voltage represented by the ordinate $E_a$ represents the average ordinate and is midway between the minimum and maximum value of the indicated voltage as explained in connection with Fig. 10. In this curve the minimum ordinate, which is shown as $BR_2$ in each of Figs. 9 and 10, will be found to be equal to $(2E_a-E_p)$, where $E_a$ represents the average and $E_p$ represents the maximum. The same envelope depicted by Fig. 11 is also designated in Fig. 12 for the purpose of showing the particular quantities that designate each of the numerator and the denominator of the IVR fraction as hereinabove explained. As shown by the formula herein above designated $$\frac{R_1-R_2}{kR_1+(1-k)R_2}$$

the numerator of the fraction can be seen to be equal to the difference between the maximum and the minimum envelope, which means that it is equal to $2(E_p-E_a)$. The denominator of such a fraction is equal to a value interpolated between the maximum and minimum ordinates to the envelope. As can be seen by a reference to Fig. 12, this value may be represented as the sum of the minimum ordinate plus a fraction $(k)$ of the difference between the maximum and minimum ordinates. This, for instance, may be equal to $(2E_a-E_p)+2K(E_p-E_a)$, as shown by Fig. 12. To measure IVR it is necessary to produce a signal which is proportional to the fraction $$\frac{2(E_p-E_a)}{(2E_a-E_p)+2k(E_p-E_a)}$$

Such a fraction may be written in several forms for measurement and observation purposes, each of which fractions may be particularly useful for making measurements over a selected range of values of the parameter $k$. Such conditions for measurement purposes can be set out as three groups of fractions of which the first will be where $k$ is in the range between 0 and ½; the second where $k$ is in the range between ½ and ¾; and the third where $k$ is in the range between ¾ and unity, all values in each condition being inclusive. For the first condition this will be represented $$\frac{1}{1-k} \cdot \frac{E_p-E_a}{E_a - \frac{(½-k)}{(1-k)}E_p}$$

where the condition $(0 \leq k \leq ½)$ holds. For the second condition this fraction is represented $$\frac{1}{1-k} \cdot \frac{E_p-E_a}{E_a + \frac{(k-½)}{(1-k)}E_p}$$

where the condition $(½ \leq k \leq ¾)$ holds. The last condition is shown as $$\frac{1}{k-½} \cdot \frac{E_p-E_a}{E_p + \frac{(1-k)}{(k-½)}E_a}$$

where the condition $(¾ \leq k \leq 1)$ holds.

It will be seen from each of the foregoing forms for expressing the value of IVR fraction that the first fraction is a function of only the parameter $k$. The result is that when a specific value has been chosen for $k$ these quantities become positive and finite numbers. Consequently, when a signal is produced which is proportional to the Index of Variation of Reflectance (IVR) and regardless of what value is assumed for the function $k$ it is sufficient to consider only the second fraction of each of those quantities shown above because the signal which is proportional to the second fraction is of necessity proportional to the product of each of the first and second fractions.

For the purpose of measuring the value of the Index of Variation of Reflectance the portion of the fraction which is a function of $k$ only will be omitted from further considerations.

It has already been stated above that the voltage representative of the peak reading ($E_p$) and the average reading ($E_a$) can readily be produced from a modulated carrier such as that shown by Fig. 9. The result is that a quantity such as that represented by the numerator of any of the fractions above set forth can readily be produced by connecting circuitry in such fashion that the voltage readings or measurement indicative of the maximum and the average shall be supplied in series opposition. Voltages of the foregoing character then will indicate the difference between the peak reading and the average for any operating condition.

The denominators of each of the fractions above set forth as indicative of the value of the Index of Variation of Reflectance (IVR) depend upon whether the value selected for the constant $k$ is in the range between 0 and ½, between ½ and ¾, for instance, or between ¾ and unity, for instance. For the purpose of illustrating the operating conditions assumed it will be noted that the values for the constant $k$ assumed herein at 0, ½, ¾ and unity are all of a critical nature. The voltages which represent the denominators of each of the above set forth fractions indicative of the Index of Variation of Reflectance are obtained in different ways depending upon the value which is assumed for the quantity $k$. In a case where the quantity $k$ is assumed in the range of between 0 and ½, each inclusive, the measurements of voltage may be obtained from a voltage divider. In that case the difference between the average voltage and the peak voltage (considering that portion of the peak voltage which is desired in accordance with the value of $k$ selected) can be obtained by subtractive methods and by connecting the voltages in series opposition.

Considering now the method of obtaining the value of the denominator of the fraction of the formula to designate the IVR it will be observed that the conditions where $k$ is selected as a value between the range of ½ and ¾, each inclusive, the voltages indicative of the average reading and those indicative of the peak reading determined by the value of $k$ selected may be obtained by additive methods.

For determining the denominator of the fraction denoting the Index of Variation of Reflectance where the value of $k$ is selected in the range between ¾ and unity, each inclusive, the measurement of the peak voltage reading is obtained and to this is added the fractional part of the average reading which is desired. Under the circumstances, it can be seen that for two conditions the average reading is obtained and from this, for one condition, is subtracted a portion of the peak reading and for a second condition is added a portion of the peak reading. For the third condition the peak reading is obtained and to this is added a portion of the average reading. With readings of voltages representative of each of the numerator and denominator of the several different forms of the fraction to indicate the Index of Variation of Reflectance (IVR) having been obtained or obtainable by appropriate selection from the circuitry shown the particular value of IVR may be obtained by measuring the ratio of these values. To obtain this result, for instance, the modulated carrier such as that shown schematically by Fig. 9 is passed through a variable gain amplifier prior to the time when it is desired to obtain measurements of the readings of the peak and average values of the obtained voltage. To this end the amplifier gain is controlled by an appropriate form of delayed automatic gain control circuit arranged to operate to achieve this amplification control in substantially normal fashion. Consequently, insofar as the automatic control circuits per se are concerned known forms of circuits may be utilized. With such a control established it is possible to provide values for the peak and average reading of the voltage which will bring the denominator of the fraction chosen to some appropriate pre-selected constant value. In this way the numerator voltage can then be used as a measure of IVR. Since the db change in the numerator voltage from grade to grade of assorted objects (in this instance being described, the lemons) is equal to the db change in IVR.

In an alternative scheme the voltage which represents the numerator of the various fractions may be used to establish the delayed automatic gain control voltage in such a way that the numerator voltage is always amplified to some pre-selected and pre-assigned constant value. For this selected form of operation it will be appreciated that the denominator voltage for each selected fraction then provides an inverse measure of IVR and the db change from grade to grade in the lemons is equal to the db change in IVR.

According to the present invention it is important that the object to be examined and tested be illuminated with a light of the selected wave length in such a way that light can strike the object from substantially all directions. In this way the amount of light which is reflected from the object into the photo tubes from which the output is to be used to develop the desired voltage is representative of a truly average value for the unit as a whole rather than one portion of the unit as illuminated by a single beam of light. To achieve a result of this nature the apparatus schematically depicted by Fig. 13 is arranged in such a way as generally to illuminate the object to be selected from all sides. In this selected arrangement the conventionally represented light source 21, which is of substantially constant intensity, is arranged to direct light issuing therefrom through a condensing lens system, conventionally represented at 23, in such a way that the light is directed toward a mask 25 having therein an elongated opening or slit 27. This is a narrow entrance slit which permits a selected amount of light from the source to pass beyond the mask into a collimating lens 29 and into a light dispersing prism 31. The light dispersing prism 31 causes the infalling light to be appropriately refracted in order to divide it into the different color components of the spectrum. This produced light spectrum is then focused by an objective lens 33 onto the plane of an opaque disc 35. In view of the fact that various means are known in the art to provide a light spectrum the showing of the optical arrangement to achieve this result is purely of schematic nature.

The light which reaches the surface of the disc 35 is then arranged to pass through various openings 37 and 39 located at different radial distances from the disc center. The disc is rotated at a constant angular velocity by a schematically represented motor 41, usually selected as one of the synchronous type. As the disc 35 is rotated by the motor each of the openings 37 and 39 about the periphery permits a pulse of light to pass through the plane of the disc to a pair of cylindrical lens elements 43. These lens elements divide the light passed through the openings of the rotated disc 35 into two substantially equal parts with the result that the two resulting light beams are passed to the mirror surfaces 45 to be reflected therefrom to fall upon the sample 47 (in this instance the lemon to be sorted) from substantially opposite directions thereby to illuminate the lemon over substantially its entire surface area. A part of the light reflected from the lemon surface from each direction of infalling light reaches one or more of the diagrammatically represented photo tubes 49.

These photo tubes may be of any well known variety commercially available, although it is generally preferred that they be photo tubes of high sensitivity and of the high vacuum type. These photo tubes are then connected in an operating circuit of the type schematically represented by Figs. 16 and 17, for instance, in a manner later to be described in order that the output voltages to be derived from the system may be developed in accordance with intensity of the instantaneously infalling light.

The openings 37 and 39 on the disc surface 35 may be arranged according to various patterns, as is indicated particularly by the showings of Figs. 14 and 15 setting forth in schematic fashion a portion of the surface of each of two different types of rotary disc elements. The spectrum formed upon the disc surface by the light from the prism 31 being focused thereon by the objective 33 is indicated by the dotted outline rectangle 51 with the letter R indicating the red end of the spectrum and the letter V indicating the direction of the violet end of the spectrum. With light color values in the range between red and violet falling within the elongated boundaries of the formed rectangle, the disc openings are all formed at pre-established radial distances from the disc center. The openings 37 nearest the disc center are arranged in spaced relationship about a circumferential path determined by the radius $r_1$. The outer openings 39 are located at a different fixed radial distance $r_2$. The pattern of the openings is illustrative and not limiting.

It will be observed in the arrangement of Fig. 14 that there are sets of openings located at the radial distance $r_1$ followed by another set of openings at the radial distance $r_2$, after which the pattern repeats. In the modification of Fig. 15 the openings 39' are arranged at a radial distance $r_2$ with the openings 37' at the radial distance $r_1$ and other openings between 37' and 39' and then between 39' and 37' the increasing and decreasing radial distances of successive openings changing between the limits $r_1$ and $r_2$. By the foregoing it is to be understood that the changes in radial distance are such that the arrangement of the openings about the periphery follows a generally sinusoidal pattern with the angular spacing between each opening being equal. From the foregoing it will be appreciated that the inner disc openings transmit light of a wave length which is generally longer than that wave length transmitted by the outer disc openings.

One form of circuit by which the invention herein to be described may be practiced for all values of $k$ (depending upon operating switch positions, as will be explained) is shown particularly by Fig. 16. In this connection it is important to note that while various forms of separate power supplies have been shown for different components since it is preferable in the operation to use but a single power supply. In the arrangement of the circuit of Fig. 16 the various photo tubes 49 (see Fig. 13) are connected in parallel. Operating voltage from a suitable source, such as that represented at 55, is aranged to supply the photo tubes through an inductor 57 which is shunted by a capacitor 59. The parallelly connected inductor 57 and capacitor 59 together form a parallel resonant circuit which serves as a load upon the photo tubes 49. The values of the inductance 57 and the capacity 59 are appropriately chosen so that the resonant frequency of the circuit corresponds to that frequency at which the light from the source 21 is revealed and eclipsed as it is directed toward the openings 37 and 39, for instance, of the rotary light chopping or interrupter disc 35. The voltage which is developed across the resonant circuit 57, 59 and which would correspond to the voltage shown at $e_2$ (see Fig. 4) is then applied to the control electrode 61 of a vacuum tube 63. Suitable bias voltage for the tube is provided according to well known cathode biasing methods through the use of the cathode resistor 65 connected between the tube cathode 67 and the ground 69 and appropriately by-passed by the cathode by-pass condensor 71. Purely to illustrate one form of the tube suitable for use in connection with this system reference may be made to one of a variety known as the type GL 5725. The transconductance of this tube may be controlled in conventional manner by varying the negative bias on the suppressor grid 73. Operating plate voltage for the plate or anode 75 is supplied by way of the primary winding 77 of transformer 79 from a suitable voltage source conventionally indicated at 81. This same source supplies the bias to the tube screen electrode 83, as indicated.

The secondary winding 85 of the transformer 79 is shunted by a capacitor 87 for tuning purposes, with the circuit being appropriately tuned to the same frequency to which the input to the circuit 57, 59 is resonant.

At this point it may be well to consider the functioning of the circuitry so far described. With the illumination of the object 47 being provided according to the proposal schematically represented by Fig. 13 and the light from the illuminating source being appropriately chopped by some suitable form of interrupter disc, and it then being borne in mind that the object 47 is simultaneously illuminated from several different directions, it will be appreciated that the output current from the separate photo tubes 49 represents a measure of the average light intensity reaching that particular tube as a result of the sample or object 47 being illuminated from the particular direction from which it is subjected to the light. By arranging the photo tubes 49 according to a generally symmetrical pattern it is possible to obtain an output which is generally indicative of the reflectance of the object over its entire surface. To this end the photo tubes 49 are positioned in a substantially symmetrical pattern about the sample. According to one arrangement one photo tube may be located at the center of each face of a regular polyhedron with the sample at its center. The showing in Fig. 13 does not indicate specifically the tridimensional arrangement of the photo tubes but it should be borne in mind that in the actual apparatus preferred the photo tubes should be arranged to pick up the light from the upper and lower surfaces of the object as well as the front, rear and end surfaces. The summation of the photo electric currents flowing through the photo tubes with object illumination is a measure of the total light reflected from the object or sample 47. The summation of all the photo tube currents is proportional to the average reflectance from the object or sample. Such summation current is obtained by connecting all of the photo tubes 49 in parallel (of which two such tubes are shown in parallel in the schematically shown circuit of Fig. 16). It is desirable that these photo tubes shall operate at voltage saturation, which type of operation is well known in the art.

As the disc 35 is rotated, and assuming for instance that the disc apertures or slots are arranged according to the pattern of Fig. 14, the object or sample 47 is illuminated alternately and recurrently by a series of light pulses of which one series is limited to one finite (extremely narrow) band of wave lengths (illustratively, for instance, approximately 6800 A.) and then by a second series of light pulses limited to a second finite (also extremely narrow) band of wave lengths (for instance, a wave length in the range of say 7200 A.). The current pulses which result from the several photo tubes, 49 parallelly connected in a circuit such as that shown by Fig. 16 consequently excite the oscillating circuit 57, 59, as already explained. The voltage developed across the oscillatory circuit (schematically represented by the value $e_2$ as per Fig. 4) is then applied to the grid or control electrode 61 of the tube 63. With the illumination of the sample or object 47 occurring at the two selected wave lengths, the relative value of the series of pulses developed from the photo tubes 49 (it being appreciated that the frequency at which light at each wave length selected is revealed and eclipsed is the same) may be influenced by several factors other than the variation in reflectance of the sample as a result of the illuminating light wave length. To illustrate, there might be a difference in either light intensity or photo tube sensitivity in the two selected measuring bands which could have an effect upon the relative magnitude of the developed current pulses. Such condition is minimized, or even completely eliminated, by suitably proportioning the openings 37 in the disc 35 with respect to the openings 39 in the same disc. The proportioning is of such character that if the sample or object 47 is replaced by a body having a uniform reflectance in the light wave lengths measured a substantially unmodulated carrier frequency is developed as a result of the light chopping action. Under these circumstances light reflected from the object or sample 47 produces a modulated carrier voltage across the tuned circuit 57, 59 of a character such that the maximum instantaneous voltage amplitude is proportional to average reflectance from the object at the particular light value or wave length instantaneously used to illuminate it and the minimum instantaneous amplitude holds a substantially like proportion to the average sample reflectance when the sample is illuminated by light at the second selected wave length. This voltage is amplified by the tube 63 and caused to appear in the tuned circuit 85, 87 forming the output of the transformer 79.

For the purpose of providing circuitry wherein measurements may be made for all selected values of the constant $k$ between the assumed values of 0 and 1, each inclusive, as discussed in the portion of this description preceding, a uni-control switching instrumentality comprising switch arms 88, 89 and 90 provided with a common control 91 is arranged to connect the output of the tube 63 to one or another of two different forms of utilization circuits. With the switch arms 88, 89 and 90 in the upper position to rest against contacts 92, 93 and 94, the final output is obtainable at two output terminals 95 and 97. In the lower position of the switch arms 88, 89 and 90 against the contacts 92', 93' and 94' the output is available at output terminal points 95' and 97'.

A rectifier 101 of any suitable type, such as the illustrated contact type diode (or where desired a high vacuum type of tube), is connected in a conventional condenser-input, half-wave rectifier circuit. The load circuit of this diode is made up of the capacity 103 and the resistor 105 connected in parallel thereto. The time constant of this C-R circuit is made very long in comparison with the duration of one modulation cycle of the output voltage appearing across the tuned secondary circuit of the transformer 79 and herein represented $e_s$. Under these conditions the voltage developed across the load is substantially a D.C. voltage which is equal to the peak amplitude of the voltage $e_s$ which is available at the tuned secondary circuit of the transformer 79.

A diode element 107 of a character similar to the diode 101 is connected in a second condenser-input, half-wave rectifier circuit. The load circuit of the diode 107 comprises the resistance 109 shunted by the capacity 111. Connected to this circuit is a resistor 113 which is very large in comparison to the resistor 109 so that the loading effect of this resistor and the therewith associated condensor 115 is negligible on the load 109. The time constant of the resistance-capacity circuit 109, 111 is very long in comparison with the period of the carrier component of the voltage $e_s$ appearing across the tuned secondary circuit of the transformer 79 and very short in comparison with the period of the modulation component.

In addition to certain A.C. components, the voltage developed across the resistor 109 contains a D.C. component which is substantially equal to the average amplitude of the voltage represented at $e_s$. Consequently, it will be observed that the combination of the resistor 113 and the capacitor 115 constitutes a low pass filter which operates in well known manner to reject the A.C. component of the voltage wave appearing across the resistor 109 and thus permits only the D.C. component to appear across the condenser 115.

The voltage which is available between the terminal points 97 and 95 is equal to the difference between the peak amplitude and the average amplitude of the voltage $e_s$ across the tuned secondary of the transformer 79. It will be observed that this voltage measured between the terminal points 97 and 95 is the desired difference voltage representing the numerator of the IVR fraction as above described. The voltage between the terminal point 97 and the adjustable tap 117 to the resistor 105 is equal to the average amplitude of the voltage $e_s$ minus the pre-selected fraction of the peak amplitude as was previously explained. The particular value of this fraction determined by the relationship $$\frac{(\frac{1}{2}-k)}{(1-k)}$$

is determined by the location of the variable tap 117, which, incidentally is always limited to the range between the junction of resistor 105 and capacity 115 and half of the resistance value of resistor 105. Consequently, the voltage which is available between the terminal point 97 and the tapping point 117 is that which is defined by the denominator of the IVR fraction for conditions when the value of $k$ is selected in the range between 0 and $\frac{1}{2}$, each inclusive, it being emphasized again that the tapping point 117 never exceeds $\frac{1}{2}$ the resistance value between the connection to the capacitor 115 and the terminal 95.

The voltage available from a source conventionally indicated at 119 and the voltage between the points 97 and 117 connect in series opposition and the remaining voltage is then applied through a diode 121 and across the resistor 123 to bias the suppressor grid 73 of the tube 63. Under the circumstances, the transconductance of the tube 63 is lowered to such a value as to produce a voltage between the terminal point 97 and the tapping point 117 that is only slightly greater than the voltage available across the indicated source 119. With such a connection established, the voltage available between the terminal points 97 and 95 is a measure of the particular value of the IVR fraction which is associated with the signal voltage $e_s$ appearing across the tuned secondary winding of the transformer 79, as already explained.

The portion of the circuit of Fig. 16 so far described is utilized, however, only when the value of the constant $k$ is chosen in the range between 0 (which would place the tapping point 117 at the center of the resistor 105) and when the constant $k$ is chosen at a value of $\frac{1}{2}$ (which would place the tapping point 117 at precisely the junction of connecting resistor 105 to the condenser 115).

When the value of the constant $k$ is assumed greater than $\frac{1}{2}$, circuit modifications must be provided. Following the formula where there is added to the average value of voltage a selected portion of the peak voltage for a value of the constant $k$ set between $\frac{1}{2}$ and $\frac{3}{4}$ and a condition where there is added to the peak voltage a portion of the average voltage for a condition when the constant $k$ is selected in the range between $\frac{3}{4}$ and unity demands further circuit modifications. Further than this, it will be observed that such a denominator value of the explained IVR fraction may be obtained by a weighted addition of the peak and average amplitudes. To achieve a result of such a nature recourse may be had to that portion of the circuit of Fig. 16 of which the terminal points 92', 93' and 94' form the input terminals with the switch arms 88, 89 and 90 in their lower positions. In this form of the circuit arrangement the components shown to the right of the dash-dot line and identified by the primed additions to the similarly numbered components of the upper portion of the circuit operate and function in a manner like that already explained, so that further detailed reference to these circuit components will not herein be included. The objective is to produce a voltage between the terminal points 97' and 95' which is equal to the difference between the peak amplitude of the voltage $e_s$ and the average amplitude.

Considering the portion of the circuit to the left of the dash-dot line the rectifier 125 is connected to produce a D.C. voltage across the condenser 127 which is equal to the pre-selected fraction of the average amplitude of the secondary voltage $e_s$. The value of this voltage is determined by the location of the tapping point 129 on the resistor 131. Otherwise it will be observed that the portion of the circuit shown to the left of the dash-dot line has its counter parts in the portion of the circuit to the right of this same dash-dot line with the exception of the fact that the rectifier 125 is reversed in polarity with respect to the rectifier 107' and that a portion of the voltage across the resistor 131 is obtainable, as against the complete voltage across the resistor 109. Under these conditions, the capacitor 133 functions in the same manner as the capacitors 111' and 111 and the resistor 135 finds its counterpart in the resistors 113 and 113'.

While the voltage source 119' in the lower portion of Fig. 16 is connected to the circuit very slightly differently from the connection of the voltage source 119 in the upper portion of the circuit its function is generally similar. For this form of circuit connection the voltage which is available between the tapping point 117' and the point of connection 137 of the high resistor 135 and the condenser 127 consists of the voltage representative of the peak voltage (or a chosen fraction thereof) plus the average voltage (or a chosen fraction thereof). If the tapping points 117' on the resistor 105' and the tapping point 129 on the resistor 131 are suitably located the voltage available between the points 117' and 137 can be made to correspond to the denominator of the IVR fraction as stated for the conditions where the value of $k$ is selected in the range between ½ and ¾, each inclusive and ¾ and unity, each inclusive.

The voltage which is available at the point 137 is then applied to the automatic gain control diode 121. In this instance this voltage is made equal to the voltage of the source 119' minus the voltage between the points 117' and 137. Under these circumstances it will be apparent that here again the voltage available between the terminal points 97' and 95' can be considered as representative of the IVR fraction hereinabove explained.

With the circuit described by Fig. 16 there is available between the terminal points 95 and 97 a D.C. voltage which is a measure of the "Index of Variation of Reflectance." This developed voltage may be utilized in various ways to control suitable sorting apparatus by which the objects measured as to their lighting reflectance as exhibited to the photo tubes 49 can be segregated one from another for conditions where a different "Index of Variation of Reflectance" is represented by the voltage developed between the terminals 95 and 97 or the object may be maintained in the same grouping if the voltage developed between these terminal points for successive objects remains substantially constant. It must, of course, be borne in mind that the segregation between objects is established within the limits of the classifications selected.

Various forms of control circuits to achieve this result may be adapted. One such control may be that form which is disclosed by U.S. Letters Patent No. 2,627,347 granted to this applicant on February 3, 1953 and entitled "Photoelectric Control Circuit." To operate such a control circuit in one form it may be assumed that there is connected between the terminal points 95 and 97 a resistance 98 which is a very high value as compared to the impedance indicated between the two points 95 and 97 due to other circuit components of Fig. 16. This resistance value is necessary so that there is no appreciable loading on circuit of Fig. 16 introduced by the resistant element 98. Under such circumstances the controlling "Thyratrons" for operating various sorting gates may then be tapped, as indicated, at various points along the resistance 98 between the terminals 95 and 97 so that in accordance with the voltage developed across this resistance one or another of various sorting gates may be controlled in its operation, as explained in the mentioned U.S. Letters Patent No. 2,627,347.

In a modified form of the circuit arrangement as shown by Fig. 17 there is a second circuit form wherein components found in Fig. 16 and herein functioning in like fashion are represented by like numerals. The circuit of Fig. 17 is one which is particularly adapted for a form of operation wherein the constant $k$ is selected at a value of ½. In this form of circuit the photo tubes 49 are also connected in parallel. Across these photo tubes there is the shunt connected tuned resonant circuit comprising the inductance 57 and the capacity 59, which circuit connects at one end to ground 69 by way of capacitor 145, the functioning of which will later be mentioned. The battery or voltage source, conventionally represented at 147, connects with its negative terminal poled toward the cathodes of the photo tubes 49 and its positive terminal connected to ground.

The voltage developed across the tuned circuit 57, 59 is supplied in the same manner as explained in connection with Fig. 16 to the grid or control electrode 61 of the pentode amplifier tube 63. Biasing voltage for the pentode in the arrangement shown is provided by the connection of the grid or control electrode 61 through the resonant circuit and the resistor 149 to a tapping point 151 on the source 147. Voltage for the tube plate and screen is supplied in the manner explained in connection with Fig. 16.

The output from tube 63, as derived from the transformer 79 also feeds into a tuned circuit comprising the transformer secondary winding 85 tuned by the capacity 87. One end of this tuned secondary circuit connects to the anode 155 of a diode 157 whose cathode 159 connects to the opposite end of the tuned secondary circuit by way of the cathode resistor 161 which forms the output resistance of the diode. The rectified signal output from the diode 157, as made available across resistor 161, is supplied to a suitable sorting control device (not shown) through a coupling condenser 163 to a terminal output point 165.

The end of the tuned circuit 57, 59 which is capacitively grounded through the condenser 145 also connects to the plate or anode 169 of an automatic gain control tube 173 which has its cathode element 175 connected to a second tapping point 177 on the source 147. The grid or control electrode 181 of the automatic gain control tube 173 is connected to be supplied by way of the conductor 183 with an output voltage which is determined by the current flowing through the diode 157 developing a voltage drop across the load resistor 161. A capacity 185, later to be discussed in more detail, shunts the load resistor 161. The voltage made available on the conductor 183 is smoothed by the integrating or filtering effect of the circuit comprising the resistor 187 and the capacity 189, which functions in substantially the usual manner to provide the smoothing effect of any low pass filter.

Brief reference to the operation of the foregoing circuit may now be made. In explaining the operation both its quiescent and excited states will be considered. As in the preceding circuit of Fig. 16, the resonant circuit, comprising the inductance 57 and the capacitor 59, is one in which the impedance is relatively high and uniform at the carrier and side band frequencies. The carrier frequency, as already specified, is determined by both the rate of rotation of the disc 35 and the angular spacing of the apertures therein. When no light reaches the photo tubes 49 and the circuit is in its quiescent state it is, of course, apparent that the current which will flow through the tube 63 will be constant. No current at all will flow through the diode 157 or the automatic gain control tube 173 under such circumstances. For these conditions the biasing voltage supplied to the photo tubes 49 will be that portion of the voltage source 147 between the tapping point 151 and that terminal of the source which is connected to the conductor 179.

By the same token the D.C. bias voltage available at the control grid 61 of the tube 63 is represented by that voltage of the source 147 which is available between the tapping point 151 and ground 69. This voltage is selected at such a value that the grid of the tube 63 operates at its minimum grid bias, where its transconductance is a maximum. However, with no exciting illumination on the photo tubes 49 no voltage is applied to the diode 157 through the transformer. This results in no voltage drop being made available across the cathode load resistance 161 of the diode 157 with the result that the grid or control electrode 181 of the automatic gain control tube 173 is biased negatively by a voltage which is represented by that portion of the source 147 between the tapping point 177 and its negative terminal which is selected at a value sufficient to cut off the tube.

If light modulation now reaches the photo tubes 49 there is a cyclic space current generated, as already explained. This current flows through the tuned circuit 57, 59 to develop a voltage across the circuit. The reactance of the condenser 145 is very low at the carrier and side band frequencies with the result that substantially the entire voltage across the tuned circuit 57, 59 is available at the grid 61 of the tube 63. Consequently, this signal is amplified from the tube 63 and appears across the tuned secondary circuit 85, 87 from which it is applied to the diode 157 to cause a current flow therethrough and through the resistance 161 shunted by the capacity 185. The capacity 185 is chosen so that its reactance is low at the carrier frequency but high at the modulating frequency in comparison to the resistance 161 which it shunts. The result is that the high frequency components are shunted around resistor 161 and produce substantially no voltage drop across it. Consequently, the voltage which is available across resistor 161 is a measure of the D.C. component of the diode plate current and an A.C. component at the scanning frequency.

From what is stated above it should become evident that the D.C. component of the plate current from the diode 157 is proportional to the average ordinate of the envelope $E_a$, as in Fig. 12. The component at the scanning or modulating frequency is proportional to the amplitude of the envelope.

Under the circumstances, if the D.C. component of the voltage across resistor 161 is held constant for all objects by a control of the transconductance of the tube 63 the component of the voltage at the scanning frequency becomes a measure of the percentage modulation and thus of the Index of Variation of Reflectance.

Without entering into a great deal of discussion concerning the tube 173 it will be noted that its plate current flows through the resistor 149 so that the greater the plate current flow the more bias is applied to the grid 61 of the tube 63 to lower its transconductance. Any voltage which is available across the condenser 189 is, of course, effective to alter the bias on the grid 181 of the tube 173 so that at a suitably prescribed value of the average voltage across the cathode resistor 161 the bias on the tube 173 will be so reduced as to bring it to the cut off state. With this type of control the voltage on the grid 61 will not change abruptly but there will be at time delay due to the integration effect of the condenser 189. Under the circumstances, by the variation and control of the amplification within the tube 63, as established by the tube 173, it is possible to hold the average voltage which is effective across the resistor 161 at a substantially constant value.

Any A.C. component of the voltage across the resistor 161 is transferred through the coupling condenser 163 to the terminal point 165. An amplifier output tube 193 has its grid or control electrode 195 connected to receive the voltage at the terminal 165. Bias is applied to the tube 193 from the source 197 through the resistor 198. The tube 193 is preferably one whose output can be used in a manner somewhat resembling a cathode follower. There is connected between the tube cathode 199 and ground 69 a parallel resonant circuit comprising the shunt connected capacitor 200 and inductance 201. This circuit is tuned to the modulation frequency (represented on Fig. 9 as "one modulation cycle"). At the modulation frequency, the resonant circuit 200, 201 consequently looks to the tube as a resistance. The voltage appearing across the inductance 201, constituting the primary winding of a transformer 203, supplies the transformer secondary winding 205. The operation of this portion of the circuit is to control gaseous discharge tube of the so-called "Thyraton" type in order to establish the opening and closing of a plurality of sorter gates. The actual sorting mechanism is not a part of the present invention and therefore will not be described in detail herein. However, for reference purposes and in order to illustrate one form of apparatus and controlled circuitry suitable for use in this connection, reference may be made to that form of component which is set forth and described in connection with U.S. Letters Patent No. 2,627,347 granted to the present applicant on February 3, 1953 and entitled "Photo Electric Control Circuit." The tuned circuit comprising the condenser 200 and the inductance 201 serves one additional important function. It is usually desirable that there be some delay in the automatic gain control feedback circuit to prevent demodulation of the carrier wave. Accordingly, several cycles of the modulation frequency order occur before the voltage across the resistor 161 approaches a steady state. With the tube 63 normally operating at maximum transconductance when an object enters the light beam to be reflected toward the photo tubes 49, it is evident that an excessively large signal could be transferred to the tube 193 before the automatic gain control circuit can establish a steady state condition. A delay should, accordingly, be introduced between the tube 193 and any of the controlled gaseous discharge tubes (not shown herein but connected to the various tapping points shown on the secondary of the transformer 205 and explained in detail in U.S. Letters Patent No. 2,627,347 above mentioned) a delay of such a nature as that provided by this form of control which will serve to avoid premature ignition of the controlled gaseous discharge tubes (not shown) prior to signal stabilization.

Any signal applied to the tuned circuit comprising the capacity 200 and the inductance 201 from a source with a finite internal resistance, such as tube 193, will not establish immediately a steady state condition in the tuned circuit. The amplitude of the voltage finally developed across the tuned circuit will increase exponentially with time. The rate of increase may be established by an appropriate control of the so-called "Q" characteristic of the circuit. To this end the tuned circuit comprising the capacity 200 and the inductance 201 should be so designed that the voltage across it increases more slowly than the automatic gain control circuit reduces the voltage across the resistor 161. In this way it is possible to preclude the development of a voltage on the grids of the control gaseous discharge tubes or "Thyratrons" (not shown in Fig. 17 but described in Letters Patent No. 2,627,347) until the steady state condition has been established in the load circuit of the diode rectifier 157.

The segregated objects, when sorted for color in accordance with the sorting methods disclosed, as determined by the current flowing through the tube 193 and the inductance 201 shunted by the capacity 200 control the current flowing in the secondary winding 205 of the transformer 203. The secondary winding 205 is appropriately tapped, as indicated, to control the opening and closing, for instance, of such sorting gates. The gates may be of various forms but illustrative of one such form is that which may be used as shown by U.S. Letters Patent No. 2,675,917 granted to the present applicant on Apr. 20, 1954 and entitled "Sorting Device."

Various modifications of the invention hereinabove described may, of course, be made. It will be apparent that, while the description herein presented proposes that the carrier frequency be introduced by the chopping action of the rotary disk element 35, it will be appreciated that an equivalent effect can be introduced into the circuits by providing an interrupter in the circuit which would interrupt the output of the phototubes, for instance, at a rate which coincided with that desired and obtained from the rotary disk element.

Also, a change of such nature might be provided through the provisions of suitable ways and means to control the voltage effective at different points in the circuit so that output responses equivalent to those obtained and described herein might be had.

While, as a matter of practical convenience, it is usually desirable to adopt the form of apparatus herein shown, it nonetheless will be appreciated that it is within the scope of this invention to provide for illuminating the object with a continuous band of light of appreciable extent between selected minimum and maximum wavelengths. Where the light intensity is generally constant, this may include the complete visible spectrum, and even limited portions of the infra-red and ultraviolet adjacent thereto, or it may include only a selected portion of the spectrum, and, if desired, certain invisible wavelengths adjacent thereto.

In such form of operation the light reflected to the phototubes is arranged to pass through suitable filters which progressively limit the wavelength of light which can enter the phototube to develop the output current. In this way the illuminating light as it is reflected from the object is effective at the phototube as if it were of only a minute portion of the spectrum, so that by shifting the filter instantaneously interposed in the path of the reflected light between the object and the phototube the desired effect can be had. A filter of such nature may comprise either a rotary filter having, for instance, transparencies peripherally positioned therein, and of such character as to pass extremely narrow bands of light, or it may comprise a moving strip which progressively reveals different bands of light. Where desired, the transparencies, if they are of the characteristics of a filter, may be separated one from the other along a circular path of a disk which rotates between the object and the phototube. The separate filter sections would be spaced by opaque sections of the rotary disk so that the carrier frequency desired is automatically introduced by interruptions in the light directed into the phototube, according to the described embodiment. Similar effects may be provided where a continuously moving film strip is used, except that under such conditions it is usually desirable to have the film strip formed from alternating opaque and transparent sections, with the transparent sections having light-transmitting properties corresponding to the desired filter. The so-reflected light then enters into the phototube through a light slit of suitable size and width.

In this connection the last-suggested embodiment is such that it is important that the continuously moving filter strip or the rotary filter be so operated that the same light color is revealed to all phototubes simultaneously. Likewise, interruptions in the light, if these be provided, all occur simultaneously. To this end, precise synchronizing and phasing operations are essential if the desired ratio to represent the Index of Variation of Reflectance (IVR) is to be accurately maintained. Various ways and means to accomplish these synchronizing and phasing effects are known, and, per se, form no part of this invention except insofar as they are usable in conjunction with the described arrangement so that any suitable structural form may be used.

While the precise operation of the sorting gates has not been set forth in detail herein, it nonetheless will be appreciated that the loading applied to the tapping points of the transformer may, where desired, function in accordance with the above-mentioned and referred-to applications. It therefore is to be understood that the control voltages available at the terminal points of the transformer secondary 205 are to be utilized and they are so set up that when so utilized they shall function to provide for selecting the final product in accordance with its color and in accordance with its Index of Variation of Reflectance (IVR) as established by the operation hereinbefore described.

Various other modifications are, of course, possible and contemplated within the teachings of the present disclosure.

Having now described the invention, what is claimed is:

1. In a device for identifying an object according to its color, means to develop a first signal, $R_1$, proportional in magnitude to the reflectance of the object at a wavelength of illuminating light occupying a portion only of the visible spectrum, means to develop a second signal, $R_2$, proportional in magnitude to the reflectance of the object at a wavelength of illuminating light occupying a different portion of the visible spectrum, and means to combine the developed signals according to the relationship $$\frac{R_1-R_2}{KR_1+(1-K)R_2}$$

where K is an arbitrarily chosen number between and including zero and unity and where $R_1$ is greater than $R_2$.

2. In a device for identifying an object according to its color, means to illuminate an object by light of wavelengths within the visible range of the spectrum, photoelectric means to translate the illuminating light reflected from the object into electrical currents defining in sequence a first signal, $R_1$, and a second signal, $R_2$, each proportional in magnitude to the reflectance of the object at selected non-overlapping wavelengths of illuminating light, and means to combine the developed signals according to the relationship, $$\frac{R_1-R_2}{KR_1+(1-K)R_2}$$

where K is an arbitrarily chosen number between and including zero and unity and where $R_1$ is greater than $R_2$.

3. In a device for identifying an object according to its color, means to illuminate the object cyclically with non-overlapping bands of light wavelengths, photoelectric means to convert light reflected from the object with illumination into a pair of cyclically recurring signal values designated as $R_1$, and $R_2$ which are respectively proportional in magnitude to the reflectance of the object to wavelengths of illuminating light occupying the two selected different portions of the visible spectrum, and means to combine the developed signals according to the relationship $$\frac{R_1-R_2}{KR_1+(1-K)R_2}$$

where K is an arbitrarily chosen number between and including zero and unity and where $R_1$ is greater than $R_2$.

4. The device claimed in claim 3 comprising, in addition, means for successively and cyclically interrupting each developed signal $R_1$ and $R_2$.

5. The device claimed in claim 4 comprising, in addition, an electrical circuit including parallelly connected inductance and capacity elements tuned to resonance at the signal interruption frequency, and means for exciting the resonant circuit by the signals $R_1$ and $R_2$ to produce signal output therefrom proportional to the recurring signals.

6. In a device for identifying an object according to its color, means to develop a first signal, $R_1$, proportional in magnitude to the reflectance of the object at a wavelength of illuminating light occupying a portion only of the visible spectrum, means to develop a second signal $R_2$, in like proportion to the magnitude of the reflectance of the object at a wavelength of illuminating light occupying a different portion of the visible spectrum, and means to combine the developed signals according to the relationship $$\frac{R_1-R_2}{KR_1+(1-K)R_2}$$

where K is an arbitrarily chosen number between and including zero and unity and where $R_1$ is greater than $R_2$.

7. The method of identifying an object by its color as a result of light reflected therefrom which comprises illuminating the object from a plurality of directions, instantaneously restricting the illumination of the object to a band of light wavelengths comprising a fraction only of the total visible spectrum, converting light reflected from the object into electrical currents, cyclically shifting the instantaneously effective illuminating band of light wavelengths for conversion into electrical currents between different portions of the visible spectrum with the selected portions being selected in the range between maximum and minimum wavelengths, generating measuring signals from the developed electrical currents produced by illuminating the object cyclically and sequentially by the different bands of light wavelengths to generate a signal constituting the ratio of difference in developed currents due to reflectance of light from the object at each of the maximum and minimum selected wavelengths to an interpolated value of current in the range between the selected maximum and minimum values for developing the currents.

8. The method of identifying an object by its color as a result of light reflected therefrom, which comprises illuminating the object, converting the light reflected from the object into electrical currents, the instantaneous currents providing indications representative of illumination of the object by a continuous band of light wavelengths occupying a minute fraction only of the total light wavelength range within which the object is illuminated, cyclically shifting the instantaneously effective light wavelength range for conversion into electrical currents in the range between selected minimum and maximum wavelengths, and generating from the developed currents a measuring signal which is the ratio of the difference in reflectance of light from the objects at each of a selected minimum and maximum wavelength of cyclic shift to a reflectance value interpolated between the minimum and maximum values of reflectance.

9. The method of identifying objects according to color under the control of currents developed as a result of light reflected from the objects, which comprises illuminating the objects, converting the light reflected from the objects into electrical currents, the instantaneous currents developed representing values of illumination of the objects by a continuous range of light wavelengths occupying a minute fraction only of the total light wavelength range within which the objects are illuminated, cyclically shifting the instantaneously effective light wavelength range for conversion into electrical currents in simple harmonic manner in each direction in the range between selected minimum and maximum wavelengths, and generating a measuring signal from the developed currents which is of the ratio of the difference in reflectance of light from the objects at each of the minimum and maximum wavelengths to a reflectance interpolated therebetween.

10. In an apparatus adaptable for use in identifying objects according to color, when said objects are exhibited in sequence, a light source emitting light of generally constant intensity over a selected range of light wavelengths, means for directing light from the source to illuminate the objects, means to convert the light reflected from the objects upon illumination into electrical currents, means for alternating the effective light wavelength directed to the objects between two different substantially monochromatic values each of minute range relative to the complete range of light wavelengths emitted, and means to produce from the light-initiated currents control signals, representative of the ratio between the difference of the developed current at maximum and minimum light wavelengths selected for illumination to a current interpolated between the said two current values.

11. The apparatus claimed in claim 10 comprising, in addition, means to oscillate the light wavelength effective to produce currents representative of the light reflectance from the objects in the range between the minimum and maximum wavelengths selected.

12. The apparatus claimed in claim 11 including means to produce pulsations in the currents developed by the conversion of light to electrical currents.

13. The apparatus claimed in claim 12 wherein the means to produce the pulsating currents includes means to cyclically eclipse and reveal the light to the objects.

14. The apparatus claimed in claim 13 comprising, in addition, means to control the revealing and eclipsing of the light to the objects at a rate which is high relative to the rate of shift between selected wavelengths of the illuminant.

15. In a device for describing an object according to its color, means for producing a first current indicative of the reflectance of light from the object in one finite region of the spectrum, means for producing a second current indicative of the reflectance of light from the same object at a second finite region of the spectrum different from the first, and means for deriving from the developed currents a control signal which is the ratio of the difference in the said two current values to a current in the range to and including the maximum current and the minimum current.

16. In a device for describing an object according to its color as claimed in claim 15, means to maintain the same proportionality in the currents to the reflectance at each finite wave length of illumination.

17. In a device for describing an object according to its color, a parallel resonant circuit, means for producing a series of voltage pulses whose repetition rate substantially corresponds to the resonant frequency of the resonant circuit, the wave form of the pulses developed being such that the average voltage during each pulse multiplied by the duration of each pulse is proportional to the average reflectance of the object in one finite region of the spectrum, means for producing a second series of voltage pulses of an equal number and like repetition rate and of such wave form that the product of the average value of the voltage during each pulse multiplied by the duration of each pulse is in like proportion to the average reflectance of the object in a second finite region of the spectrum different from the first, means for impressing all of the developed voltage pulses on the resonant circuit to develop an oscillating current therein, means for deriving from the resonant circuit voltages proportional to the maximum light reflectance and voltages indicative of a light reflectance of a lesser value, and means for combining the developed voltages in selected ratios.

18. A device adaptable for color identification of objects comprising a resonant circuit, means for producing voltage pulses indicative of the average reflectance of light from the objects to be identified when the objects are illuminated by light confined within a first finite region of the spectrum, means for producing voltage pulses indicative of the average reflectance of light from the objects to be identified when the objects are illuminated by light confined to a second finite region of the spectrum, each selected finite region of the light spectrum being of a narrow range relative to the range of the complete visible spectrum, the voltage pulses developed indicating the reflectance of light from the objects in each selected finite region of the spectrum, means to alternate the illumination between the two selected light values to cause the said voltage pulses to have a uniform rate of recurrence which corresponds substantially to the resonant frequency of the resonant circuit, means for applying the developed pulses to the resonant circuit to cause the generation therein of oscillating currents and means for utilizing the voltages developed from the oscillating currents to produce voltages indicative of the reflectance of light from the objects with illumination at each of the two selected light values.

19. The combination claimed in claim 18 comprising, in addition, means for cyclically and repeatedly impressing the developed voltage pulses upon the resonant circuit as alternating series of pulses each of like duration and of a like number of pulses for each finite region of spectral illumination.

20. A device adaptable for use in the sorting of objects according to color comprising a closed resonant circuit, means for producing a first series of voltage pulses indicative of the average reflectance of light from the objects to be sorted in one finite region of the spectrum with the pulses occurring at a frequency substantially coinciding with the natural oscillatory frequency of the resonant circuit, means for producing a second series of voltage pulses indicative of the average reflectance of the objects to be sorted in a second finite region of the spectrum and recurring at the same frequency as the first series of voltage pulses, means for alternating the pulses of each series at a rate which is long relative to the pulse frequency, means for applying the developed pulses to the closed resonant circuit to cause the generation therein of oscillating currents building to a generally stabilized amplitude during the circuit excitation by the voltage pulses indicative of each chosen spectral illumination, and means for deriving from the voltages developed from the oscillating currents voltages which are indicative of the maximum and minimum instantaneous amplitudes of voltage across the tuned circuit and means to establish from the developed voltages a control voltage determined by the ratio of the voltage difference between the voltages developed and a value interpolated in the range between the voltages developed to be indicative of the object color.

21. The method of identifying objects according to color comprising the steps of developing a first signal proportional in magnitude to the reflectance of the objects at a wavelength of illuminating light occupying a portion only of the visible spectrum, developing a second signal proportional in magnitude to the reflectance of the objects at a wavelength of illuminating light occupying a different portion of the visible spectrum, and combining the developed signals according to the relationship $$\frac{R_1 - R_2}{kR_1 + (1-k)R_2}$$

where $k$ is an arbitrarily chosen number between zero and unit $y$, each inclusive, and $R_1$ is indicative of a signal of greater magnitude than $R_2$.

22. In a device for identifying an object according to its color, means for alternately and cyclically illuminating the object with two different bands of wavelengths of light each within the visible spectrum, photoelectric means for converting the reflected light from the objects to be sorted into currents indicative of the light reflectance at the illuminating wavelengths, means for introducing interruptions in the illuminating light at a selected rate substantially coinciding with a pre-selected frequency to interrupt the developed currents at a like rate, a parallel resonant circuit connected to receive the output from the photoelectric light-translating means and to have developed thereacross voltages proportional to the light reflectance from the object at the instantaneously effective illuminating light wavelengths, the resonant frequency of said circuit corresponding substantially to that of the effective interruption frequency in the illuminating light, means to derive control voltages proportional to the light reflectance at each of the effective bands of wavelengths of illumination where the light reflectance at the first band of wavelengths of illumination provides the maximum voltage and the light reflectance at the second band of wavelengths of illumination provides a voltage of lesser magnitude, means for combining the developed voltages according to the relationship $$\frac{R_1 - R_2}{kR_1 + (1-k)R_2}$$

where the value $R_1$ represents the maximum voltage, $R_2$ is the lesser voltage at the selected effective wavelengths of illumination, and $k$ is an arbitrarily chosen number between and including zero and unity, and means for compensating for non-uniformity of response of the circuit parameters at the different effective wavelengths of illumination.

23. In a device for identifying an object according to color, means for alternately and cyclically illuminating the object with two different bands of wavelengths of light each within the visible spectrum, photoelectric means for converting the reflected light from the objects to be sorted into currents indicative of the light reflectance at the illuminating wavelengths, means for introducing interruptions in the illuminating light at a selected rate substantially coinciding with a pre-selected frequency to interrupt the developed currents, a parallel resonant circuit connected to receive the output from the photoelectric light-translating means and to have developed thereacross voltages proportional to the light reflectance from the object at the instantaneously effective illuminating light wavelengths, the resonant frequency of said circuit corresponding substantially to the effective interruption frequency in the illuminating light, means for amplifying the developed voltage pulses to provide output currents proportional to the light reflectance of each effective light wavelength of illumination, means to derive from the amplified developed currents control voltages proportional to the maximum light reflectance at one effective band of wavelengths of illumination and also to a second effective band of wavelengths of illumination where the second measure of light reflectance represents reflectance effective at a band of wavelengths of illumination between the minimum and maximum effective for illumination, means for combining the developed voltages according to the relationship $$\frac{R_1 - R_2}{kR_1 + (1-k)R_2}$$

where the value $R_1$ represents the maximum voltage, $R_2$ is a lesser voltage at the selected second effective band of wavelength of illumination, and $k$ is an arbitrarily chosen number between and including zero and unity, and means for controlling the amplification of the first-developed signals to compensate for non-uniformity of response of the circuit parameters at the different effective wavelengths of illumination.

24. Apparatus adaptable for identifying objects according to color comprising means for alternately and cyclically illuminating the objects to be identified with two different bands of light wavelengths occupying different portions of the visible spectrum, means to convert light reflected from the illuminated objects to be sorted into electrical pulses of magnitudes proportional to the reflectances at the different illuminating wavelengths, means to provide a pulse frequency of like selected value for each wavelength of illumination, a resonant circuit having a natural period of oscillation substantially corresponding to the pulse frequency, means for applying the pulses to the resonant circuit to develop therefrom for each change in the illuminating band of light wavelengths an oscillating voltage exponentially approaching a stable value, a pair of rectifier elements connected each to receive the developed voltage, a load circuit comprising a capacity and a parallelly connected resistor for each rectifier, one of said capacity and resistor combinations having a time constant which is long in comparison to the rate of change between selected illuminating light wavelengths and the other of said time constant circuits having a constant which is short compared to the time constant of the first rectifier circuit and large in comparison to the frequency of the developed voltage pulses, one of said circuits providing a means to derive a voltage corresponding to the peak voltage supplied to the rectifiers, and the other of said circuits providing a means to derive a voltage corresponding to the average amplitude of the voltage supplied to the rectifiers, and means to combine the developed voltages to provide a ratio of the voltages representing a difference between a maximum and the average voltage to the average voltage and a fraction between zero and one-half of the peak voltage.

25. Apparatus adaptable for identifying an object according to its color comprising means for cyclically illuminating the object with two different bands of light wavelengths each occupying different portions of the visible spectrum, means to convert light reflected from the illuminated object into electrical pulses of magnitudes proportional to the light reflectances at the different bands of illuminating light wavelengths, means to provide a pulse frequency of like selected value for each band of wavelengths of illumination, a resonant circuit having a natural period of oscillation substantially corresponding to the pulse frequency, means for applying the electrical pulses to the resonant circuit to develop therefrom for each change in the band of illuminating light wavelength a series of electrical pulses exponentially approaching a stable value, a pair of rectifier elements each connected to receive the developed pulses, a load circuit comprising a capacity and a parallelly connected resistor for each rectifier, one of said capacity and resistor combinations having a time constant which is long in comparison to the rate of change between selected illuminating light wavelengths and the other of said time constant circuits having a constant which is short compared to the time constant of the first rectifier circuit and large in comparison to the frequency of the developed voltage pulses, one of said circuits providing a means to derive a voltage corresponding to the peak voltage supplied to the rectifiers, and the other of said circuits providing a means to derive a voltage corresponding to the average amplitude of the voltage supplied to the rectifiers, and means to combine the developed voltages to provide a ratio of the voltages representing a difference between a maximum and the average voltage to the average voltage and a portion of the peak voltage between zero and unity.

26. Apparatus adaptable for sorting objects according to color comprising means for cyclically illuminating the objects to be sorted by bands of light wavelengths occupying different portions of the visible spectrum, means to convert light reflected from the illuminated objects to be sorted into voltage pulses of magnitudes proportional to the reflectances at the different illuminating wavelengths at a pulse frequency of like selected value for each wavelength of illumination, a resonant circuit having a natural period of oscillation substantially corresponding to the pulse frequency, means for applying the voltage pulses to the resonant circuit to develop therefrom for each change in illuminating light wavelength a series of voltage pulses exponentially approaching a stable value, a pair of rectifier elements each connected to receive the developed voltage pulses, a load circuit comprising a capacity and a parallelly connected resistor for each rectifier, one of said capacity and resistor combinations having a time constant which is long in comparison to the rate of change between selected illuminating light wavelengths and the other of said time constant circuits having a constant which is short compared to the time constant of the first rectifier circuit and large in comparison to the frequency of the developed voltage pulses, one of said circuits providing a means to derive a voltage corresponding to the peak voltage supplied to the rectifiers, and the other of said circuits providing a means to derive a voltage corresponding to the average amplitude of the voltage supplied to the rectifiers, and means to combine the developed voltages to provide a ratio of the voltages representing a difference between a maximum and the average voltage to the maximum and a portion of the average voltage between zero and unity.

27. The method of distinguishing objects one from another under the control of currents developed from light reflected from objects which comprises alternately illuminating the objects by light of different wavelengths, converting light reflected from the objects into electrical currents, restricting the instantaneous object illumination to wavelength ranges of light occupying each a minute and different portion of the visible spectrum, interrupting the effect of the illumination of each light wavelength a like number of times during each period the object is illuminated, and then distinguishing the objects one from the other in accordance with a selected ratio of reflectances which is derived from current measurements at the maximum light wavelength of effective illumination and at the light wavelength less than maximum.

28. The method of distinguishing objects one from the other under the control of currents developed by light reflectance from the objects which comprises illuminating the objects, converting light reflected from the objects into electrical currents, instantaneously restricting the effective illumination of the objects to a range of light wavelengths occupying a minute portion only of the wavelength range of the visible spectrum, cyclically switching the effective illumination of the object between a maximum light wavelength of illumination and a shorter light wavelength of illumination, introducing the effect of a chopping of the resulting electrical output at each light wavelength of illumination with a like number of chopping cycles at each wavelength, the chopping frequency being higher than the switching frequency, and then distinguishing the objects one from the other in accordance with a ratio of reflectances which is derived from current measurements at the selected maximum effective light wavelength of illumination and at the wavelength less than maximum effective for illumination.

29. In a device for describing objects according to color, means for illuminating individual objects over substantially the complete surface area thereof alternately by two substantially different monochromatic light wavelengths each of which is selected in a different region of the visible spectrum, means for producing a first current indicative of the average of the maximum reflectance of light from the entire surface of the object under illumination by the substantially monochromatic light in the first region of the spectrum, means for producing a second current indicative of the average reflectance of light from the same object under illumination by the substantially monochromatic light in the second and different region of the spectrum, and means for deriving from the developed currents a signal indicative of the ratio of the difference in the said two current values to a current which is derived from the measured current values.

30. Apparatus for use in the sorting of tri-dimensional objects according to color under the control of currents developed from light reflected from the objects which comprises means for illuminating the objects to be sorted from at least two directions to illuminate substantially the entire object, means for converting light reflected from the objects into electrical currents, means for restricting the instantaneous illumination to substantially monochromatic light, means for cyclically shifting the illuminating light between different parts of the visible spectrum, means for interrupting the effective illumination of the objects by each monochromatic light exposure a light plurality of times during each period of cyclic shift, and means for developing a control current adaptable for sorting the objects in accordance with a selected ratio of reflectances which is derived from current measurement at each of the maximum light wavelengths of effective illumination and at a light wavelength of effective illumination less than the maximum.

31. In differentiating apparatus particularly adapted for the sorting of objects as to color, a source of light, means disposed in the path of the light from the source for dispersing the light into a spectrum, means disposed in the path of the spectrum for alternately illuminating individual objects by selected bands of light at different regions of the developed spectrum, each light band being of a narrow frequency range relative to the complete spectrum, light responsive means for sampling the surface reflectance of the illuminated object to said selected bands of light thereby to produce an electrical impulse output, and circuit means connected to said light responsive means for converting said electrical impulse output to electrical control signals for selecting different color objects from among those illuminated.

32. In color differentiating apparatus adaptable for use in sorting tri-dimensional objects, a source of light, means for dispersing the said light into a spectrum, means disposed in the path of the formed spectrum for selecting two separated bands of light waves, means for directing the said selected bands of light waves upon an object alternately to illuminate substantially the entire surface thereof by each light band, parallelly connected light responsive means positioned at a plurality of different viewing points relative to the objects to receive light reflected from substantially the entire surface thereof for indicating the average surface luminosity of the object surface independently of the size and shape, and circuit means connected to receive the combined output of the light responsive means for producing electrical control signals.

33. A device for identifying an object according to its color comprising means to flood the object alternately with light of two distinct continuous bands of light wavelengths in the light spectrum, means sequentially to produce separately identifiable signals $R_1$ and $R_2$ proportional to the light reflectance at each illuminating band of light wavelengths, and means to combine the two developed signals according to the relationship $$\frac{R_1-R_2}{KR_1+(1-K)R_2}$$

to produce a signal indicative of the index of variation of reflectance, where K is an arbitrarily chosen number between and including zero and unity and where $R_1$ is greater than $R_2$.

34. A device for identifying an object according to its color comprising means to flood the object alternately with light of two distinct continuous bands of light wavelengths separated in the light spectrum from each other, means to produce separately identifiable signals $R_1$ and $R_2$ proportional to the light reflectance at each illuminating band of light wavelengths, and means to combine the two developed signals according to the relationship $$\frac{R_1-R_2}{KR_1+(1-K)R_2}$$

to produce a signal indicative of the index of variation of reflectance, where K is an arbitrarily chosen number between and including zero and unity and where $R_1$ is greater than $R_2$.

35. In a device for identifying an object according to its color, means to develop two signals $R_1$ and $R_2$, respectively, proportional in magnitude to the reflectance of the object at two different bands of wavelengths of illuminating light each occupying a portion only of the visible spectrum and means to combine the developed signals according to the relationship $$\frac{R_1-R_2}{KR_1+(1-K)R_2}$$

where K is an arbitrarily chosen number between and including zero and unity and where $R_1$ is greater than $R_2$.

36. In a device for identifying an object according to its color, means to develop two signals $R_1$ and $R_2$, respectively, proportional in magnitude to the reflectance of the object at two wavelengths of illuminating light each occupying a portion only of the visible spectrum, and means to combine the developed signals according to the relationship $$\frac{R_1-R_2}{KR_1+(1-K)R_2}$$

where K is an arbitrarily chosen number between and including zero and unity and where $R_1$ is greater than $R_2$.

37. In sorting apparatus, means for progressively and individually illuminating a succession of objects with a plurality of cyclically and alternately selected beams of substantially monochromatic light confined to two selected and different wavelengths, means for determining the reflectance of the individual objects to each of the illuminating light beams, and means for producing signals for selecting and rejecting the objects in correlation with a determination of whether the ratio of the difference in reflectance at the two illuminating light wavelengths to a reflectance indication determined by at least one of the two selected light wavelengths lies within or without a selected value range.

References Cited in the file of this patent

UNITED STATES PATENTS

| | | |
|---|---|---|
| 1,828,875 | Nason | Oct. 27, 1931 |
| 1,987,441 | Hardy | Jan. 8, 1935 |
| 2,162,529 | Dawson et al. | June 13, 1939 |
| 2,176,013 | Pineo | Oct. 10, 1939 |
| 2,218,357 | Pineo | Oct. 15, 1940 |
| 2,244,826 | Cox | June 10, 1941 |
| 2,439,373 | Stearns | Apr. 6, 1948 |
| 2,678,581 | Reisner | May 18, 1954 |
| 2,678,725 | Jacobson | May 18, 1954 |

UNITED STATES PATENT OFFICE
CERTIFICATION OF CORRECTION

Patent No. 2,933,613                      April 19, 1960

John B. Powers

It is hereby certified that error appears in the above numbered patent requiring correction and that the said Letters Patent should read as corrected below.

Column 1, line 25, for "degress" read -- degrees --; column 2, line 45, for "object" read -- objects --; line 58, for "difference" read -- differences --; column 4, line 1, for "devicest" read -- devices --; column 8, in the table, heading to column 2 thereof, after "Reflectance", each occurrence, strike out the comma; same column 8, same table, heading to column 4, thereof, after "Ratio" strike out the comma; same column 8, line 64, for "the", second occurrence, read -- this --; column 12, line 28, before "developed" insert -- is --; column 13, line 3, for "reflectancs" read -- reflectances --; line 13, for "designed" read -- designated --; column 21, line 54, for "adapted" read -- adopted --; column 22, line 51, for "eflect" read -- effect --; column 23, line 56, for "at" read -- a --; column 27, line 55, strike out "of", first occurrence; column 32, line 5, after "from" insert -- the --.

Signed and sealed this 12th day of September 1961.

(SEAL)
Attest:

ERNEST W. SWIDER                            DAVID L. LADD
Attesting Officer                               Commissioner of Patents